US012578420B2

(12) United States Patent
Lee et al.

(10) Patent No.: US 12,578,420 B2
(45) Date of Patent: Mar. 17, 2026

(54) METHOD AND ELECTRONIC DEVICE FOR MEASURING POSITION ON BASIS OF ANTENNA

(71) Applicant: Samsung Electronics Co., Ltd., Suwon-si (KR)

(72) Inventors: Muyeol Lee, Suwon-si (KR); Byungsu Lee, Suwon-si (KR); Yonglak Cho, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/297,254

(22) Filed: Apr. 7, 2023

(65) Prior Publication Data
US 2023/0243916 A1      Aug. 3, 2023

Related U.S. Application Data

(63) Continuation of application No. PCT/KR2021/014440, filed on Oct. 18, 2021.

(30) Foreign Application Priority Data

Oct. 20, 2020      (KR) ........................ 10-2020-0135935

(51) Int. Cl.
*G01S 5/04*          (2006.01)
*G01S 13/02*        (2006.01)
(Continued)

(52) U.S. Cl.
CPC ............ *G01S 5/04* (2013.01); *G01S 13/0209* (2013.01); *G06F 1/1652* (2013.01); *H01Q 1/243* (2013.01); *H04M 1/0214* (2013.01)

(58) Field of Classification Search
CPC ...... G01S 5/04; G01S 13/0209; G06F 1/1652; H01Q 1/243; H04M 1/0214
(Continued)

(56) References Cited

U.S. PATENT DOCUMENTS 7,290,718 B2      11/2007  Sekita
10,440,512 B2    10/2019  Prevatt et al.
(Continued)

FOREIGN PATENT DOCUMENTS

JP          7065112 B2          5/2022
KR    10-2017-0066944 A        6/2017
(Continued)

OTHER PUBLICATIONS

International Search Report with English translation dated Jan. 24, 2022; International Appln. No. PCT/KR2021/014440.
(Continued)

*Primary Examiner* — Joel Ajayi
(74) *Attorney, Agent, or Firm* — Jefferson IP Law, LLP

(57) ABSTRACT

An electronic device is provided that includes a foldable housing. The foldable housing includes a hinge module, a first housing, and a second housing. The first housing is connected to the hinge module and includes a first surface facing a first direction, a second surface facing a second direction opposite to the first direction, and a first antenna supporting a first frequency band. The second housing is connected to the hinge module and includes a third surface facing a third direction, a fourth surface facing a fourth direction opposite to the third direction, and a second antenna supporting the first frequency band, and is folded with the first housing with respect to the hinge module. In the electronic device, in a folded state in which the first surface faces the third surface, the first antenna and the second antenna may be arranged to be spaced apart from
(Continued)

each other by half a wavelength corresponding to the first frequency band, and in an unfolded state in which the first direction and the third direction are the same direction, the first antenna and the second antenna may be arranged to be spaced apart from each other by an error range or more, wherein the error range corresponds to the first frequency band.

18 Claims, 23 Drawing Sheets

(51) Int. Cl.
| | |
|---|---|
| *G06F 1/16* | (2006.01) |
| *H01Q 1/24* | (2006.01) |
| *H04M 1/02* | (2006.01) |

(58) Field of Classification Search
USPC ...................................................... 455/456.1
See application file for complete search history.

(56) References Cited

U.S. PATENT DOCUMENTS

| | | | |
|---|---|---|---|
| 10,812,637 B2 | 10/2020 | Jung et al. | |
| 10,833,397 B2 | 11/2020 | Lee et al. | |
| 11,056,768 B2 | 7/2021 | Kim et al. | |
| 11,315,445 B2 | 4/2022 | Li et al. | |
| 2008/0191954 A1* | 8/2008 | Tsujimura | H01Q 9/40 |
| | | | 343/787 |
| 2008/0297401 A1 | 12/2008 | Nishida | |

| | | | |
|---|---|---|---|
| 2012/0001822 A1 | 1/2012 | Liu et al. | |
| 2014/0240178 A1 | 8/2014 | Chun et al. | |
| 2016/0235341 A1 | 8/2016 | Choi et al. | |
| 2018/0234797 A1* | 8/2018 | Ledvina | H04W 4/023 |
| 2019/0064312 A1 | 2/2019 | Jeon et al. | |
| 2019/0170847 A1 | 6/2019 | Jamin et al. | |
| 2020/0076062 A1 | 3/2020 | Lee et al. | |
| 2020/0333855 A1 | 10/2020 | Kim et al. | |
| 2020/0344336 A1 | 10/2020 | Li et al. | |
| 2021/0020076 A1 | 1/2021 | Li et al. | |
| 2021/0219437 A1 | 7/2021 | Kim et al. | |
| 2022/0352637 A1 | 11/2022 | Han et al. | |

FOREIGN PATENT DOCUMENTS

| | | | |
|---|---|---|---|
| KR | 10-2019-0143029 A | 12/2019 | |
| KR | 10-2060733 B1 | 12/2019 | |
| KR | 10-2020-0018282 A | 2/2020 | |
| KR | 10-2020-0027734 A | 3/2020 | |
| KR | 10-2020-0031607 A | 3/2020 | |
| KR | 10-2020-0067567 A | 6/2020 | |
| KR | 10-2020-0117959 A | 10/2020 | |
| KR | 10-2229913 B1 | 3/2021 | |
| KR | 10-2021-0111050 A | 9/2021 | |
| KR | 10-2022-0039370 A | 3/2022 | |
| KR | 10-2440484 B1 | 9/2022 | |
| WO | 2020/046032 A2 | 3/2020 | |

OTHER PUBLICATIONS

Korean Office Action dated Nov. 17, 2025, issued in Korean Application No. 10-2020-0135935.

* cited by examiner

METHOD AND ELECTRONIC DEVICE FOR MEASURING POSITION ON BASIS OF ANTENNA

CROSS-REFERENCE TO RELATED APPLICATION(S)

This application is a continuation application, claiming priority under § 365 (c), of an International application No. PCT/KR2021/014440, filed on Oct. 18, 2021, which is based on and claims the benefit of a Korean patent application number 10-2020-0135935, filed on Oct. 20, 2020, in the Korean Intellectual Property Office, the disclosure of which is incorporated by reference herein in its entirety.

BACKGROUND

1. Field

The disclosure relates to a method and an electronic device for measuring a position based on an antenna.

2. Description of Related Art

Along with the recent development of wireless communication technology, electronic devices (e.g., communication electronic devices) are widely used in everyday life, and thus a level required by user's demand therefor has constantly increased. Various types of wireless communication technologies are used for satisfying the high level required by user demand. For example, the wireless communication technologies may include at least one of ultra-wideband (UWB) communication, wireless-fidelity (Wi-Fi) communication, long term evolution (LTE) communication, 5th generation (5G) communication (or new radio (NR) communication), or Bluetooth communication. Increase in wireless communication speed makes it possible for electronic devices to provide users with content that requires a lot of data usage without interruption.

For example, an electronic device performing ultra-wideband communication may provide an ultra-high-speed wireless communication service to a user, based on polarization characteristics of a UWB antenna. An electronic device uses a UWB antenna to measure position thereof or a position of an external electronic device (e.g., an external electronic device in communication with the electronic device).

The above information is presented as background information only to assist with an understanding of the disclosure. No determination has been made, and no assertion is made, as to whether any of the above might be applicable as prior art with regard to the disclosure.

SUMMARY

According to various embodiments, multiple antennas may be mounted to an electronic device and a position may be measured by using multiple antennas. For example, the electronic device may measure a distance to an external electronic device and an angle (e.g., an arrival of angle (AoA)) with an external electronic device by using the multiple antennas.

According to an embodiment, a foldable electronic device may include multiple housings (e.g., a first housing and a second housing), and may be operated in one of a folded mode (e.g., a folding mode) and an unfolded mode (e.g., an unfolding mode). The foldable electronic device supporting UWB communication may perform a positioning operation by using at least three UWB antennas. The foldable electronic device may include a first housing and a second housing and may have a difficulty to secure a space for three UWB antenna to be co-located in one housing.

Aspects of the disclosure are to address at least the above-mentioned problems and/or disadvantages and to provide at least the advantages described below. Accordingly, an aspect of the disclosure is to provide an electronic device including multiple housings wherein the electronic device is designed to have an internal structure for receiving at least one antenna distributively disposed therein and maintains positioning accuracy while having antennas disposed in different housings.

Additional aspects will be set forth in part in the description which follows and, in part, will be apparent from the description, or may be learned by practice of the presented embodiments.

In accordance with an aspect of the disclosure, an electronic device including is provided that includes a foldable housing. The foldable housing includes a hinge module, a first housing, and a second housing. The first housing is connected to the hinge module and includes a first surface facing a first direction, a second surface facing a second direction opposite to the first direction, and a first antenna supporting a first frequency band. The second housing is connected to the hinge module and includes a third surface facing a third direction, a fourth surface facing a fourth direction opposite to the third direction, and a second antenna supporting the first frequency band, and is folded with the first housing with respect to the hinge module. In the electronic device, in a folded state in which the first surface faces the third surface, the first antenna and the second antenna may be arranged to be spaced apart from each other by half a wavelength corresponding to the first frequency band, and in an unfolded state in which the first direction and the third direction are the same direction, the first antenna and the second antenna may be arranged to be spaced apart from each other by an error range or more, the error range corresponding to the first frequency band.

In accordance with another aspect of the disclosure, an electronic device is provided. The electronic device includes a sensor module for detecting a folding mode in which the first housing and the second housing are folded around the hinge module and an unfolding mode in which the first housing and the second housing are unfolded, a first antenna disposed in the first housing and capable of transmitting and receiving a signal based on a first frequency band, a second antenna disposed in the second housing and capable of transmitting and receiving a signal based on the first frequency band, and a processor operatively connected to the sensor module, the first antenna, and the second antenna. The processor may identify the folding mode from among the folding mode and the unfolding mode by using the sensor module, transmit a first signal to an external electronic device through the first antenna, receive a first response signal to the first signal by using the first antenna, measure a first phase value corresponding to the received first response signal, receive a second response signal to the first signal by using the second antenna, measure a second phase value corresponding to the received second response signal, and perform a positioning operation with respect to the external electronic device based on the first phase value and the second phase value.

In accordance with another aspect of the disclosure, a method is provided. The method includes an operation of, by using a sensor module in an electronic device including a first housing and a second housing, identifying a folding mode in which the first housing and the second housing are folded, an operation of transmitting a first signal to an external electronic device by using a first antenna included in the first housing, an operation of receiving a first response signal to the first signal based on the first antenna and measuring a first phase value corresponding to the received first response signal, an operation of receiving a second response signal to the first signal based on a second antenna included in the second housing and measuring a second phase value corresponding to the received second response signal, and an operation of performing positioning with respect to the external electronic device based on the first phase value and the second phase value.

Various embodiments of the disclosure may provide an electronic device designed so that multiple antennas (e.g., a first antenna and a second antenna) are distributively arranged in different housing in the electronic device including multiple housings (e.g., a first housing and a second housing). The electronic device may perform a positioning operation based on a phase difference between the first antenna and the second antenna in a folded state and may perform a positioning operation based on a reception time difference of response signals between the first antenna and the second antenna in an unfolded state. According to an embodiment, the electronic device may maintain positioning accuracy even in case that antennas are distributively arranged in different housings.

According to various embodiments, the electronic device may effectively use an internal space due to antennas distributively arranged in different housings and maintain positioning accuracy without being affected by a use mode of the electronic device. In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

FIG. 6 is a block diagram of an electronic device including multiple antennas according to an embodiment of the disclosure;

FIG. 11 is a block diagram of an electronic device including an amplification circuit additionally designed in a first housing according to an embodiment of the disclosure;

FIG. 12A is an example view illustrating arrangement of a first antenna, a second antenna, and a third antenna in a rollable electronic device in a first mode according to an embodiment of the disclosure.

Throughout the drawings, it should be noted that like reference numbers are used to depict the same or similar elements, features, and structures.

DETAILED DESCRIPTION

Figure 2A:
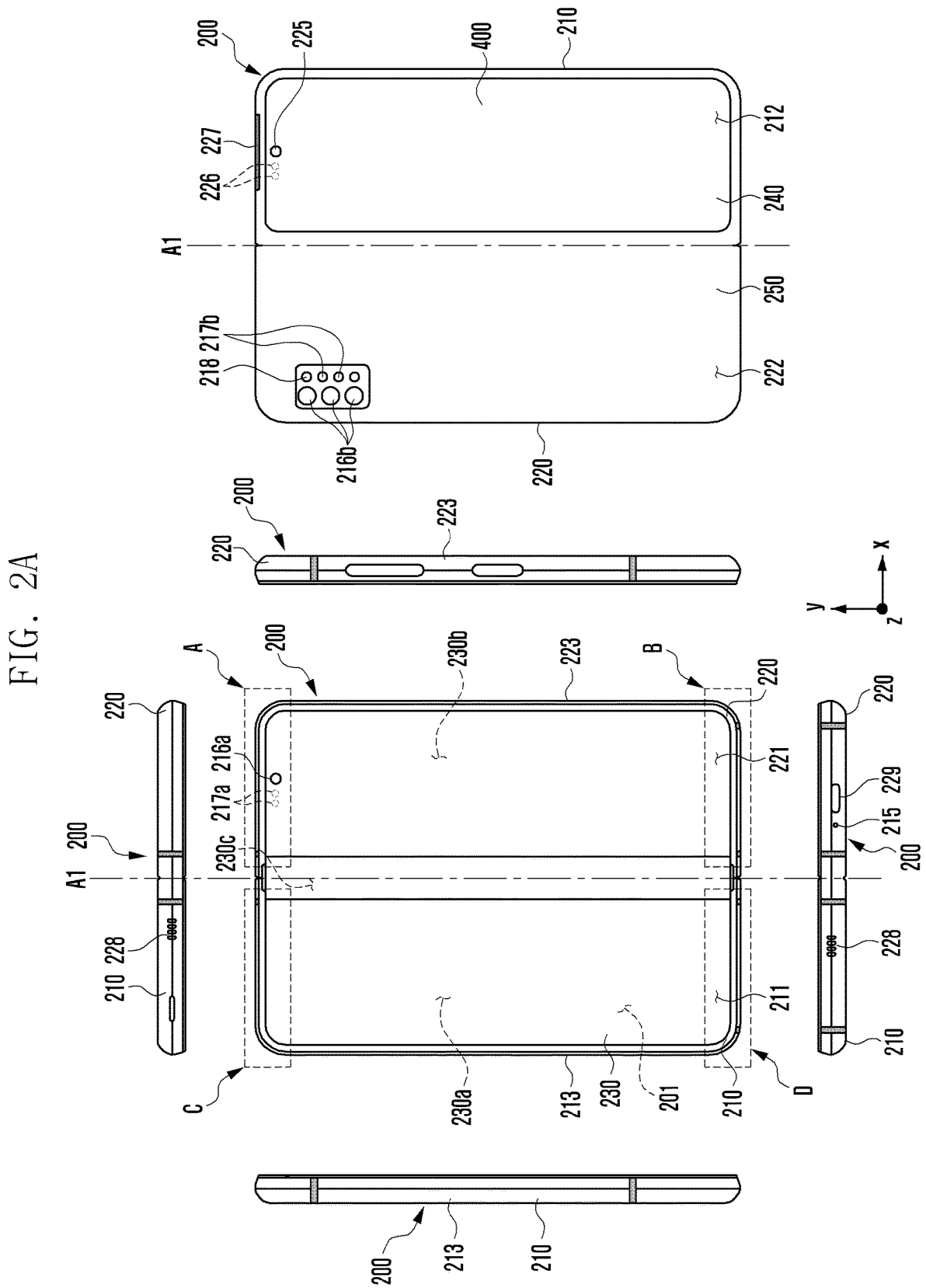
FIG. 2A is a view illustrating an unfolded state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
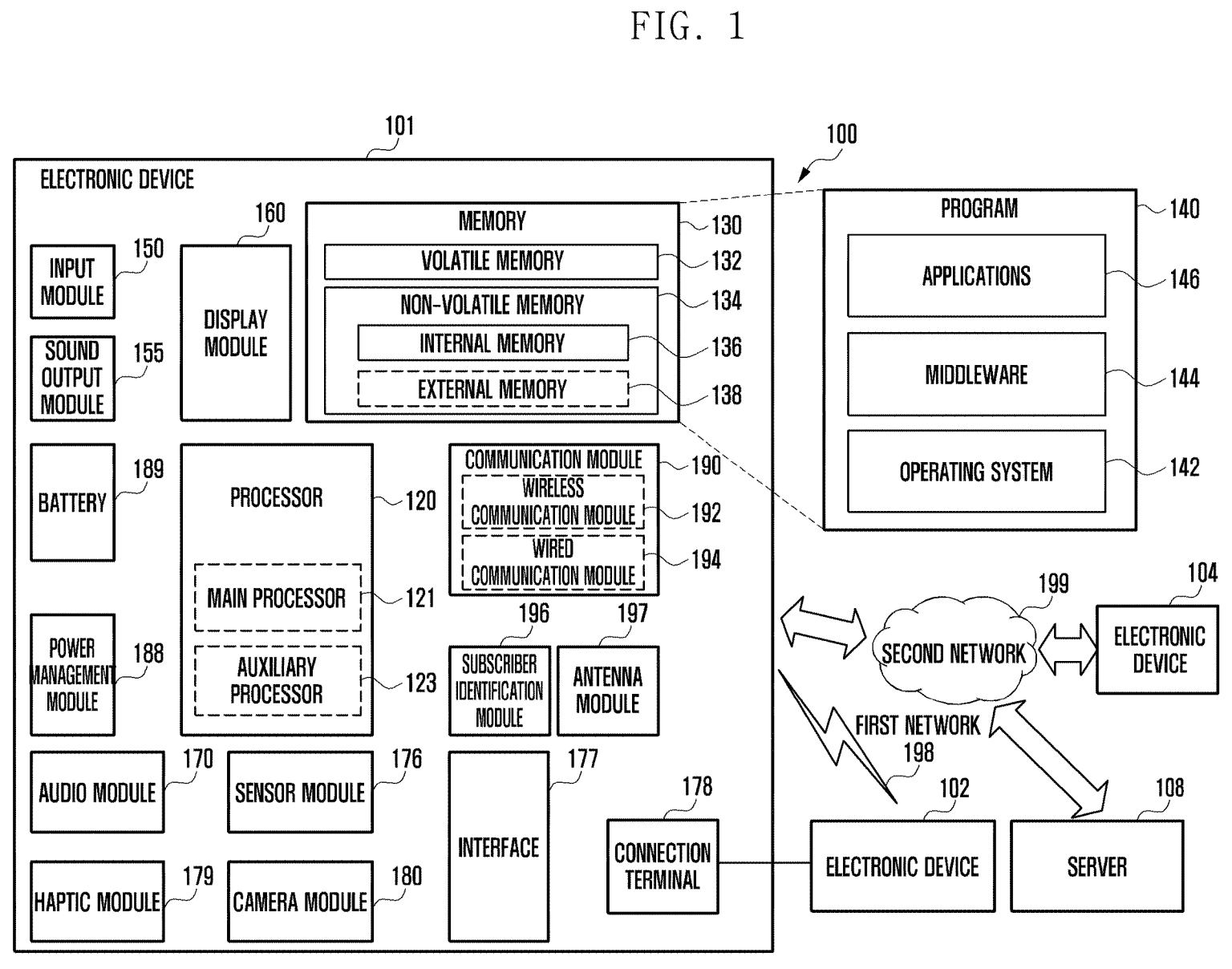

FIG. 1 illustrates a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a diagram illustrating an unfolded state of an electronic device 200 according to an embodiment of the disclosure.

Figure 2B:
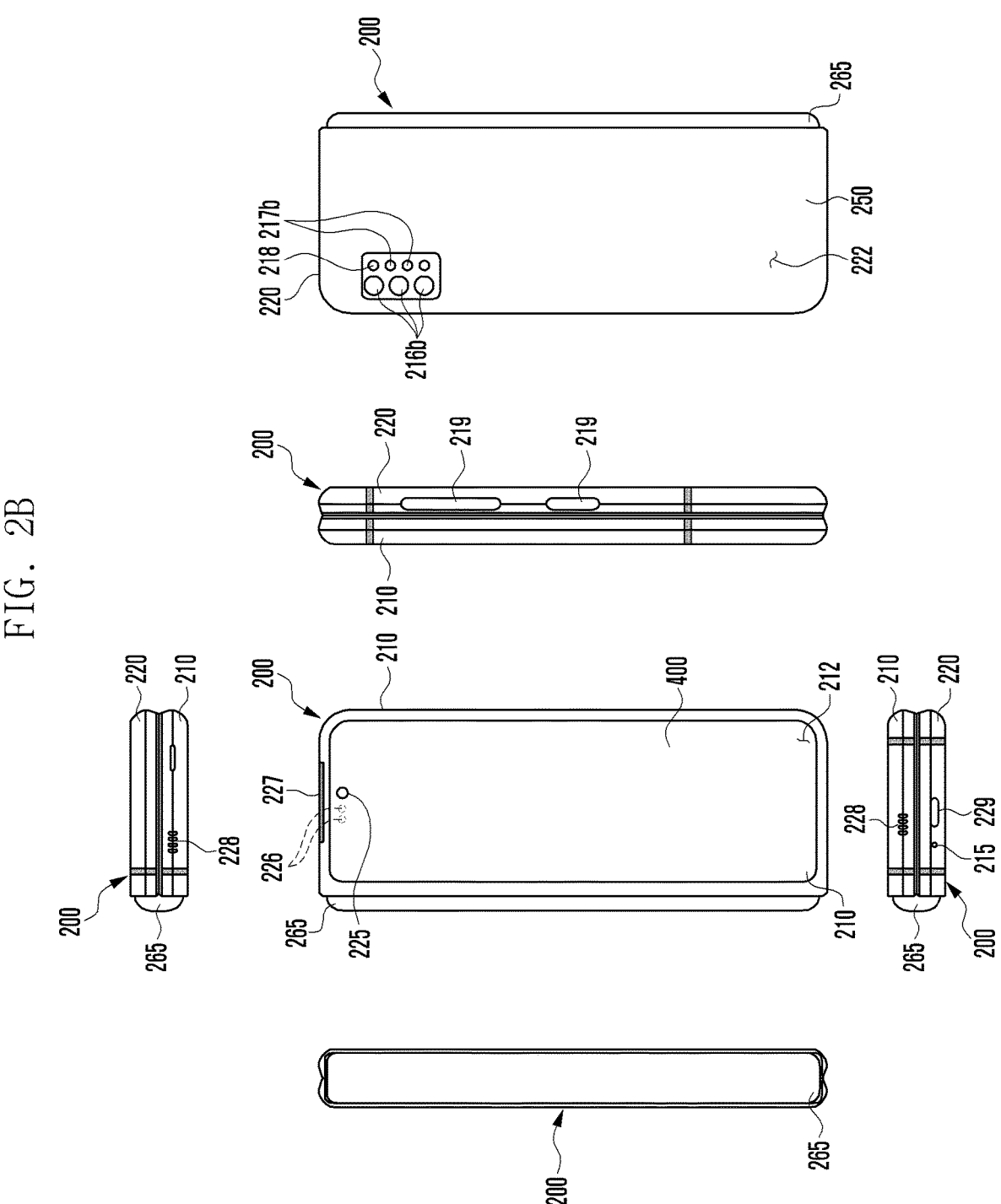
FIG. 2B is a view illustrating a folded state of the electronic device in FIG. 2A according to an embodiment of the disclosure.

FIG. 2B is a diagram illustrating a folded state of the electronic device 200 of FIG. 2A according to an embodiment of the disclosure.

Referring to FIGS. 2A and 2B, the electronic device 200 (e.g., electronic device 101 of FIG. 1) may include a pair of housings 210 and 220 (e.g., foldable housing) rotatably coupled based on a folding axis A through a hinge module (e.g., a hinge module 264 of FIG. 3) to be foldable with respect to each other, a first display 230 (e.g., flexible display, foldable display, or main display) disposed through the pair of housings 210 and 220, and/or a second display 400 (e.g., sub-display) disposed through the second housing 220. According to certain embodiments, at least a portion of the hinge module (e.g., the hinge module 264 of FIG. 3) may be disposed to not be visible from the outside through the first housing 210 and the second housing 220 and disposed to not be visible from the outside through a hinge cover 265 covering a foldable portion in an unfolded state. According to certain embodiments, the hinge module 264 may include a hinge module. In this document, a surface in which the first display 230 is disposed may be defined as a front surface of the electronic device 200, and an opposite surface of the front surface may be defined as a rear surface of the electronic device 200. Further, a surface enclosing a space between the front surface and the rear surface may be defined as a side surface of the electronic device 200.

Figure 3:
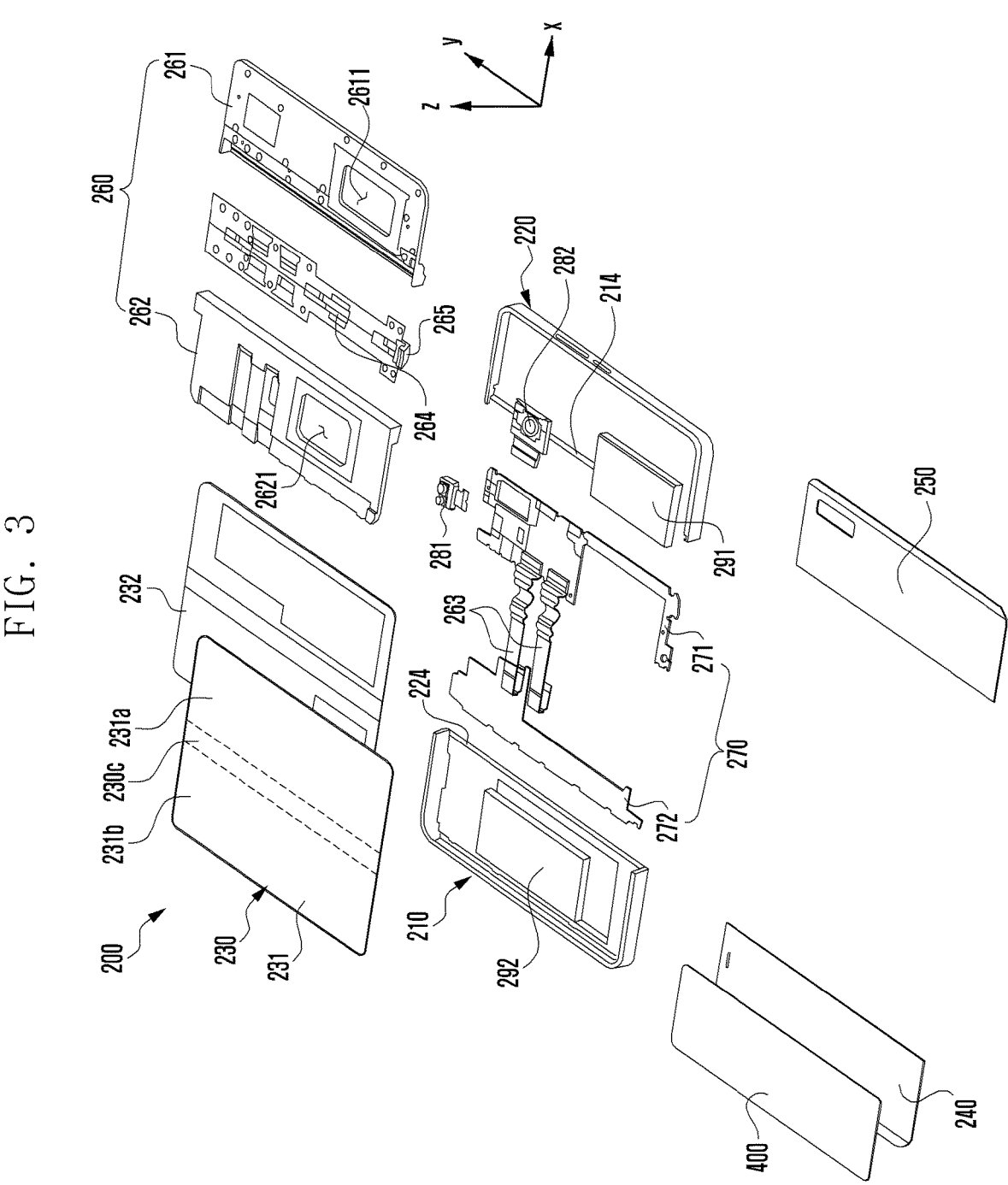
FIG. 3 is an exploded perspective view illustrating an electronic device according to an embodiment of the disclosure.

According to various embodiments, the pair of housings 210 and 220 may include a first housing 210 and second housing 220 disposed to be foldable with respect to each other through the hinge module (e.g., the hinge module 264 of FIG. 3). According to certain embodiments, the pair of housings 210 and 220 are not limited to the shape and coupling illustrated in FIGS. 2A and 2B, and may be implemented by a combination and/or coupling of other shapes or parts. According to certain embodiments, the first housing 210 and the second housing 220 may be disposed at both sides based on the folding axis A, and have an overall symmetrical shape with respect to the folding axis A. According to some embodiments, the first housing 210 and the second housing 220 may be folded asymmetrically based on the folding axis A. According to certain embodiments, the first housing 210 and the second housing 220 may have different angles or distances from each other according to whether the electronic device 200 is in an unfolded state, a folded state, or an intermediate state.

According to various embodiments, when the electronic device 200 is in an unfolded state, the first housing 210 may include a first surface 211 connected to the hinge module (e.g., the hinge module 264 of FIG. 3) and disposed to face the front of the electronic device 200, a second surface 212 facing in a direction opposite to that of the first surface 211, and/or a first side member 213 enclosing at least a portion of a first space between the first surface 211 and the second surface 212. According to certain embodiments, when the electronic device 200 is in an unfolded state, the second housing 220 may include a third surface 221 connected to the hinge module (e.g., the hinge module 264 of FIG. 3), and disposed to face the front of the electronic device 200, a fourth surface 222 facing in a direction opposite that of the third surface 221, and/or a second side member 223 enclosing at least a portion of a second space between the third surface 221 and the fourth surface 222. According to certain embodiments, the first surface 211 may face in substantially the same direction as that of the third surface 221 when the electronic device is in an unfolded state and at least partially face the third surface 221 when the electronic device is in a folded state. According to certain embodiments, the electronic device 200 may include a recess 201 formed to receive the first display 230 through structural coupling of the first housing 210 and the second housing 220. According to certain embodiments, the recess 201 may have substantially the same size as that of the first display 230.

According to various embodiments, the hinge cover 265 (e.g., hinge cover) may be disposed between the first housing 210 and the second housing 220 and be disposed to cover a hinge module disposed in the hinge cover 265. According to certain embodiments, the hinge cover 265 may be covered by a part of the first housing 210 and the second housing 220 or may be exposed to the outside according to an unfolded state, a folded state, or an intermediate state of the electronic device 200. For example, when the electronic device 200 is in an unfolded state, at least a portion of the hinge cover 265 may be covered by the first housing 210 and the second housing 220 to not be substantially exposed. According to certain embodiments, when the electronic device 200 is in a folded state, at least a portion of the hinge cover 265 may be exposed to the outside between the first housing 210 and the second housing 220. According to certain embodiments, when the first housing 210 and the second housing 220 are in an intermediate state folded with a certain angle, the hinge cover 265 may be at least partially exposed to the outside of the electronic device 200 between the first housing 210 and the second housing 220. For example, an area in which the hinge cover 265 is exposed to the outside may be smaller than that in a fully folded state. According to certain embodiments, the hinge cover 265 may include a curved surface.

According to various embodiments, when the electronic device 200 is in an unfolded state (e.g., the state of FIG. 2A), the first housing 210 and the second housing 220 form an angle of approximately 180 degrees, and a first area 230a, a folding area 230c, and a second area 230b of the first display 230 may form the same flat surface and be disposed to face in substantially the same direction. In another embodiment, when the electronic device 200 is in an unfolded state, the first housing 210 may rotate at an angle of approximately 360 degrees with respect to the second housing 220 so that the second surface 212 and the fourth surface 222 may be reversely folded to face each other (out-folding method).

According to various embodiments, when the electronic device 200 is in the folded state (e.g., the state of FIG. 2B), the first surface 211 of the first housing 210 and the third surface 221 of the second housing 220 may be disposed to face each other. In this case, the first area 230a and the second area 230b of the first display 230 may form a narrow angle (e.g., a range of 0 degree to approximately 10 degree) each other through the folding area 230c and be disposed to face each other. According to certain embodiments, at least a portion of the folding area 230c may be transformed into a curved shape having a predetermined curvature. According to certain embodiments, when the electronic device 200 is in an intermediate state, the first housing 210 and the second housing 220 may be disposed at a certain angle to each other. In this case, the first area 230a and the second area 230b of the first display 230 may form an angle larger than the folded state and smaller than the unfolded state, and a curvature of the folding area 230c may be smaller than that of the folded state and be larger than that of the unfolded state. In some embodiments, the first housing 210 and the second housing 220 may form an angle that may stop at a specified folding angle between the folded state and the unfolded state through the hinge module (e.g., the hinge module 264 of FIG. 3) (free stop function). In some embodiments, the first housing 210 and the second housing 220 may be operated while being pressurized in an unfolding direction or a folding direction based on a specified inflection angle through the hinge module (e.g., the hinge module 264 of FIG. 3).

According to various embodiments, the electronic device 200 may include at least one of at least one display 230 and 400, an input device 215, sound output devices 227 and 228, sensor modules 217a, 217b, and 226, camera modules 216a, 216b, and 225, a key input device 219, an indicator, or a connector port 229 disposed in the first housing 210 and/or the second housing 220. In some embodiments, the electronic device 200 may omit at least one of the components or may additionally include at least one other component.

According to various embodiments, the at least one display 230 and 400 may include a first display 230 (e.g., flexible display) disposed to receive support from the third surface 221 of the second housing 220 through the hinge module (e.g., the hinge module 264 of FIG. 3) from the first surface 211 of the first housing 210, and a second display 400 disposed to be visible at least partially from the outside through the second surface 212 in an inner space of the first housing 210. As another example, the second display 400 may be disposed to be visible from the outside through the fourth surface 222 in an inner space of the second housing 220. According to certain embodiments, the first display 230 may be mainly used in an unfolded state of the electronic device 200, and the second display 400 may be mainly used in a folded state of the electronic device 200. According to certain embodiments, when the electronic device 200 is in an intermediate state, the electronic device 200 may control the first display 230 and/or the second display 400 to be usable based on a folding angle of the first housing 210 and the second housing 220.

According to various embodiments, the first display 230 may be disposed in a receiving space formed by a pair of housings 210 and 220. For example, the first display 230 may be disposed in the recess 201 formed by the pair of housings 210 and 220, and when the electronic device 200 is in an unfolded state, the first display 230 may be disposed to occupy substantially most of the front surface of the electronic device 200. According to certain embodiments, the first display 230 may include a flexible display whose at least a partial area may be transformed into a flat surface or a curved surface. According to certain embodiments, the first display 230 may include a first area 230a facing the first housing 210, a second area 230b facing the second housing 220, and a folding area 230c connecting the first area 230a and the second area 230b and facing the hinge module (e.g., the hinge module 264 of FIG. 3). According to certain embodiments, area division of the first display 230 is a physical division by a pair of housings 210 and 220 and the hinge module (e.g., the hinge module 264 of FIG. 3), and the first display 230 may be displayed as a substantially seamless single full screen through the pair of housings 210 and 220 and the hinge module (e.g., the hinge module 264 of FIG. 3). According to certain embodiments, the first area 230a and the second area 230b may have an overall symmetrical shape or a partially asymmetrical shape based on the folding area 230c.

According to various embodiments, the electronic device 200 may include a first rear cover 240 disposed at the second surface 212 of the first housing 210 and a second rear cover 250 disposed at the fourth surface 222 of the second housing 220. In some embodiments, at least a portion of the first rear cover 240 may be integrally formed with the first side member 213. In some embodiments, at least a portion of the second rear cover 250 may be integrally formed with the second side member 223. According to certain embodiments, at least one cover of the first rear cover 240 and the second rear cover 250 may be formed with a substantially transparent plate (e.g., a polymer plate or a glass plate including various coating layers) or an opaque plate. According to certain embodiments, the first rear cover 240 may be formed through a substantially transparent plate such as glass or polymer, for example. According to certain embodiments, the second rear cover 250 may be formed by an opaque plate such as, for example, coated or tinted glass, ceramic, polymer, metal (e.g., aluminum, stainless steel (STS), or magnesium), or a combination of at least two of the above materials. Accordingly, the second display 400 may be disposed to be visible from the outside through the first rear cover 240 in an inner space of the first housing 210. According to certain embodiments, the first rear cover 240 may be include in the second display 400.

According to various embodiments, the input device 215 may include a microphone. In some embodiments, the input device 215 may include a plurality of microphones disposed to detect a direction of a sound. According to certain embodiments, the sound output devices 227 and 228 may include speakers. According to certain embodiments, the sound output devices 227 and 228 may include a call receiver 227 disposed through the second surface 212 of the first housing 210 and an external speaker 228 disposed through at least a portion of the second side member 223 of the first housing 210. In some embodiments, the input device 215, the sound output devices 227 and 228, and the connector 229 may be disposed in spaces of the first housing 210 and/or the second housing 220 and be exposed to an external environment through at least one hole formed in the first housing 210 and/or the second housing 220. In some embodiments, holes formed in the first housing 210 and/or the second housing 220 may be commonly used for the input device 215 and the sound output devices 227 and 228. In some embodiments, the sound output devices 227 and 228 may include a speaker (e.g., piezo speaker) operating while excluding a hole formed in the first housing 210 and/or the second housing 220.

According to various embodiments, the camera modules 216a, 216b, and 225 may include a first camera module 216a disposed at the third surface 221 of the second housing 220, a second camera module 216b disposed at the fourth surface 222 of the second housing 220, and/or a third camera module 225 disposed at the second surface 212 of the first housing 210. According to certain embodiments, the electronic device 200 may include a flash 218 disposed near the second camera module 216b. According to certain embodiments, the flash 218 may include, for example, a light emitting diode or a xenon lamp. According to certain embodiments, the camera modules 216a, 216b, and 225 may include one or a plurality of lenses, an image sensor, and/or an image signal processor. In some embodiments, at least one camera module of the camera modules 216a, 216b, and 225 may include two or more lenses (e.g., wide-angle and telephoto lenses) and image sensors and be disposed together at any one surface of the first housing 210 and/or the second housing 220.

According to various embodiments, the sensor modules 217a, 217b, and 226 may generate an electrical signal or a data value corresponding to an internal operating state of the electronic device 200 or an external environmental state. According to certain embodiments, the sensor modules 217a, 217b, and 226 may include a first sensor module 217a disposed at the third surface 221 of the second housing 220, a second sensor module 217b disposed at the second surface 212 of the first housing 210, and/or a third sensor module

226 disposed at the fourth surface 222 of the second housing 220. In some embodiments, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (e.g., time of flight (TOF) sensor or light detection and ranging (LiDAR)).

According to various embodiments, the electronic device 200 may further include a sensor module, for example, at least one of an atmospheric pressure sensor, a magnetic sensor, a biometric sensor, a temperature sensor, a humidity sensor, or a fingerprint recognition sensor. In some embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the second side member 223 of the second housing 220. In some embodiments, the key input device 219 may be disposed to be exposed to the outside through the first side member 213 of the first housing 210. In some embodiments, the electronic device 200 may not include some or all of the key input devices 219, and the non-included key input devices 219 may be implemented into other forms such as soft keys on at least one display 230 and 400. As another embodiment, the key input device 219 may be implemented using a pressure sensor included in at least one display 230 and 400.

According to various embodiments, the connector port 229 may include a connector (e.g., USB connector or interface connector port module (IF module)) for transmitting and receiving power and/or data to and from an external electronic device. In some embodiments, the connector port 229 may further include a separate connector port (e.g., ear jack hole) for performing together a function for transmitting and receiving an audio signal to and from an external electronic device or for performing a function of transmitting and receiving an audio signal.

According to various embodiments, at least one camera module 216a and 225 of the camera modules 216a, 216b, and 225, at least one sensor module 217a and 226 of the sensor modules 217a, 217b, and 226, and/or the indicator may be disposed to be exposed through at least one display 230 and 400. For example, the at least one camera module 216a and 225, the at least one sensor module 217a and 226, and/or the indicator may be disposed under a display area of the displays 230 and 400 in an interior space of the at least one housing 210 and 220 and be disposed to contact an external environment through an opening or transparent area perforated to a cover member (e.g., a window layer of the first display 230 and/or the first rear cover 240). According to certain embodiments, an area in which the displays 230 and 400 and the at least one camera module 216a and 225 face each other is a part of an area displaying contents and may be formed as a transmission area having predetermined transmittance. According to certain embodiments, the transmission area may be formed to have transmittance in a range from approximately 5% to approximately 20%. Such a transmission area may include an area overlapped with an effective area (e.g., view angle area) of the at least one camera module 216a and 225 through which light for generating an image by an image sensor passes. For example, the transmission area of the displays 230 and 400 may include an area having a lower pixel density than that of a peripheral area thereof. For example, the transmission area may replace the opening. For example, the at least one camera module 216a and 225 may include an under display camera (UDC). In another embodiment, some camera modules or sensor modules 217a and 226 may be disposed to perform functions thereof without being visually exposed through the display. For example, an area facing the camera modules 216a and 225 and/or the sensor modules 217a and 226 disposed under the displays 230 and 400 (e.g., display panel) has an under display camera (UDC) structure; thus, a perforated opening may be unnecessary.

According to various embodiments, the electronic device 200 may include at least one antenna configured with at least a portion of the second conductive side surface member 223 of the second housing 220. According to an embodiment, the at least one antenna may be disposed in an upper area (e.g., area A) and/or a lower area (e.g., area B) of the first housing 210.

According to various embodiments of the disclosure, at least one antenna may be additionally implemented by using the first conductive side surface member 213 of the first housing 210 including the second display 400. According to an embodiment, at least one antenna may be additionally disposed in the upper area (area C) and/or the lower area (area D) of the second conductive side surface member 223. In this case, a conductive sheet (e.g., the conductive sheet 444 of FIGS. 4A to 4F) of the second display 400 and a peripheral conductive structure (e.g., a substrate or a conductive electrical structure) used as a common ground may be electrically connected (grounded) to each other at at least one predetermined position in the vicinity of a feeding point of an antenna, which may be helpful to prevent deterioration in radiation performance of the antenna using the first side surface member 213.

FIG. 3 is an exploded perspective view illustrating an electronic device 200 according to an embodiment of the disclosure.

Referring to FIG. 3, the electronic device 200 may include a first display 230, a second display 400, a hinge module 264, a support member assembly 260, at least one printed circuit board 270, a first housing 210, a second housing 220, a first rear cover 240, and/or a second rear cover 250.

According to various embodiments, the first display 230 may include a display panel 231 (e.g., flexible display panel) and one or more plates 232 or layers in which the display panel 231 is seated. According to certain embodiments, the display panel 231 may include a first panel area 231a corresponding to the first area (e.g., the first area 230a of FIG. 2A) of the display 230, a second panel area 231b extended from the first panel area and corresponding to the second area (e.g., the second area 230b of FIG. 2A) of the display 230, and a third area 231c connecting the first panel area 231a and the second panel area 231b and corresponding to a folding area (e.g., the folding area 230c of FIG. 2A) of the display 230. According to certain embodiments, the one or more plates 232 may include a conductive plate (e.g., Cu sheet or SUS sheet) disposed between the display panel 231 and the support member assembly 260. According to certain embodiments, the one or more plates 232 may be formed to have substantially the same area as that of the first display 230, and an area facing a folding area (e.g., the folding area 230c of FIG. 2A) of the first display 230 may be formed to be bendable. According to certain embodiments, the one or more plates 232 may include at least one auxiliary material layer (e.g., graphite member) disposed at a rear surface of the display panel 231. According to certain embodiments, the one or more plates 232 may be formed in a shape corresponding to the display panel 231.

According to various embodiments, the second display 400 may be disposed in a space between the first housing 210 and the second rear cover 250. According to certain embodiments, the second display 400 may be disposed to be visible from the outside through substantially the entire area of the second rear cover 250 in a space between the first housing 210 and the second rear cover 250.

According to various embodiments, the support member assembly 260 may include a first support member 261 (e.g., first support plate) and a second support member 262 (e.g., second support plate). According to certain embodiments, the first support member 261 may be foldably coupled to the second support member 262 through the hinge module 264. According to certain embodiments, the electronic device 200 may include at least one wiring member 263 (e.g., flexible printed circuit board (FPCB)) disposed from at least a portion of the first support member 261 across the hinge module 264 to a portion of the second support member 262. According to certain embodiments, the support member assembly 260 may be disposed between one or more plates 232 and at least one printed circuit board 270. According to certain embodiments, the first support member 261 may be disposed between the first area (e.g., the first area 230a of FIG. 2A) of the first display 230 and a first printed circuit board 271. According to certain embodiments, the second support member 262 may be disposed between the second area (e.g., the second area 230b of FIG. 2A) of the first display 230 and a second printed circuit board 272. According to certain embodiments, the at least one wiring member 263 and/or at least a portion of the hinge module 264 may be disposed to be supported through at least a portion of the support member assembly 260. According to certain embodiments, the at least one wiring member 263 may be disposed in a direction (e.g., x-axis direction) crossing the first support member 261 and the second support member 262. According to certain embodiments, the at least one wiring member 263 may be disposed in a direction (e.g., the x-axis direction) substantially perpendicular to the folding axis (e.g., the y-axis or the folding axis A of FIG. 2A) of the folding area 230c.

According to various embodiments, the at least one printed circuit board 270 may include a first printed circuit board 271 disposed to face the first support member 261 or a second printed circuit board 272 disposed to face the second support member 262. According to certain embodiments, the first printed circuit board 271 and the second printed circuit board 272 may be disposed in an inner space formed by the support member assembly 260, the first housing 210, the second housing 220, and the first rear cover 240, and/or the second rear cover 250. According to certain embodiments, the first printed circuit board 271 and the second printed circuit board 272 may include a plurality of electronic components disposed to implement various functions of the electronic device 200.

According to various embodiments, the electronic device 200 may include a first printed circuit board 271 disposed in a first space of the second housing 220, a first battery 291 disposed at a position facing a first swelling hole 2611 of the first support member 261, at least one camera module 282 (e.g., the first camera module 216a and/or the second camera module 216b of FIG. 2A), or at least one sensor module 281 (e.g., the first sensor module 217a and/or the second sensor module 217b of FIG. 2A). According to certain embodiments, the electronic device 200 may include a second printed circuit board 272 disposed in the second space of the first housing 210 or a second battery 292 disposed in a position facing a second swelling hole 2621 of the second support member 262. According to certain embodiments, the first housing 210 may be integrally formed with the second support member 262. According to certain embodiments, the second housing 220 may be integrally formed with the first support member 261.

According to various embodiments, the second housing 220 may include a first rotation support surface 214, and the first housing 210 may include a second rotation support surface 224 corresponding to the first rotation support surface 214. According to certain embodiments, the first rotation support surface 214 and the second rotation support surface 224 may include curved surfaces corresponding to (naturally connected to) a curved outer surface of the hinge cover 265. According to certain embodiments, when the electronic device 200 is in an unfolded state, the first rotation support surface 214 and the second rotation support surface 224 may cover the hinge cover 265, thereby not exposing the hinge cover 265 from the rear surface of the electronic device 200 or exposing only a portion thereof. According to certain embodiments, when the electronic device 200 is in a folded state, the first rotation support surface 214 and the second rotation support surface 224 may rotate along the curved outer surface of the hinge cover 265 to expose at least a portion of the hinge cover 265 to the rear surface of the electronic device 200.

Figure 4A:
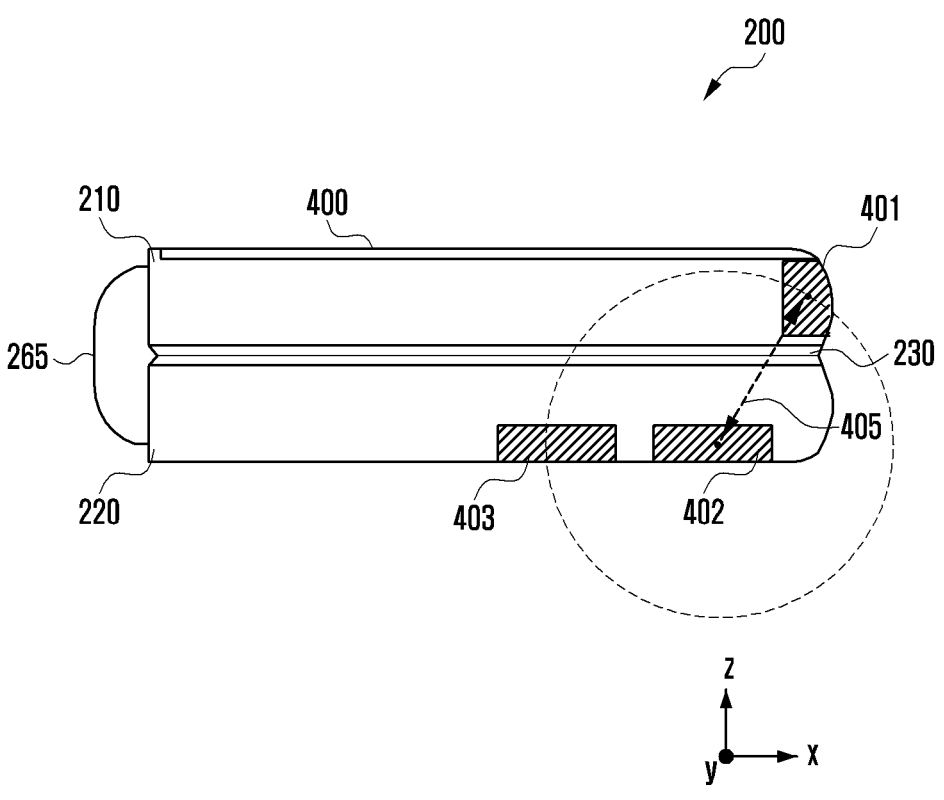
FIG. 4A is a sectional view of an electronic device in a folded state according to an embodiment of the disclosure.

FIG. 4A is a sectional view of an electronic device 200 in a folded state according to an embodiment of the disclosure.

Referring to FIG. 4A, the electronic device 200 (e.g., the electronic device 101 in FIG. 1) may include a first housing (e.g., the first housing 210 in FIGS. 2A and 2B), a second housing (e.g., the second housing 220 in FIGS. 2A and 2B), and a hinge module (e.g., the hinge module 264 in FIG. 3). In the electronic device 200, a pair of housings (e.g., the first housing 210 and the second housing 220) may be rotatably coupled to each other with reference to a folding axis A1 through the hinge module 264. FIG. 4A illustrates a folded state of the first housing 210 and the second housing 220 and the hinge module 264 may be disposed not to be seen from the outside by the hinge cover 265.

FIG. 4A illustrates a sectional view of the electronic device 200 in the folded state. Multiple antennas may be arranged in the electronic device 200 based on the first housing 210 and the second housing 220. For example, a first antenna 401 capable of transmitting and receiving a signal may be disposed in the first housing 210, and a second antenna 402 capable transmitting and receiving a signal and a third antenna 403 capable of receiving a signal may be disposed in the second housing 220. According to an embodiment, depending on an internal structure of the electronic device 200, at least one antenna may be distributively disposed in the first housing 210 and the second housing 220. According to an embodiment, arrangement form of the at least one antenna is not limited to the arrangement form shown in FIGS. 4A to 4F.

According to an embodiment, the first antenna 401, the second antenna 402, and the third antenna 403 may be operated in a communication method supporting the same frequency band. For example, the first antenna 401, the second antenna 402, and the third antenna 403 may include an antenna (e.g., a UWB antenna) supporting wireless communication according to an ultra-wide band (UWB) communication method. The UWB communication method may be a method for performing wireless communication based on a frequency band of about 6.25 GHz to 8.25 GHz. According to an embodiment, the electronic device 200 may perform UWB communication based on a frequency band of about 6.25 GHZ-8.25 GHz through the first antenna 401, the second antenna 402, and the third antenna 403. According to an embodiment, the electronic device 200 may measure an angle and a distance from an external electronic device (e.g., an external electronic device in wireless communication with the electronic device 200) by using the first antenna 401, the second antenna 402, and the third antenna 403.

According to an embodiment, in the electronic device 200 in the folded state, the first antenna 401 may be disposed spaced $\lambda/2$ 405 apart from the second antenna 402. For example, lambda ($\lambda$) be defined as a numerical value obtained by dividing a propagation speed of a wave (e.g., the speed of light (e.g., 3*10e8)) by a frequency. For example, the UWB communication method may support a frequency band of about 6.25 GHz to 8.25 GHz. According to an embodiment, lambda ($\lambda$) may be calculated by dividing a propagation speed of a wave by a frequency band and then multiplying by ½. For example, based on the frequency band of UWB communication (e.g., approximately 6.25 GHz to 8.25 GHZ), calculating $\lambda/2$ 405 gives about 1.81 cm to 2.40 cm. According to an embodiment, the first antenna 401 and the second antenna 402 may be arranged spaced 1.81 cm to 2.40 cm apart from each other. According to an embodiment, in the electronic device 200 in the folded state, the first antenna 401 and the second antenna 402 may be designed to be arranged spaced 1.81 cm to 2.40 cm apart from each other.

Figure 4B:
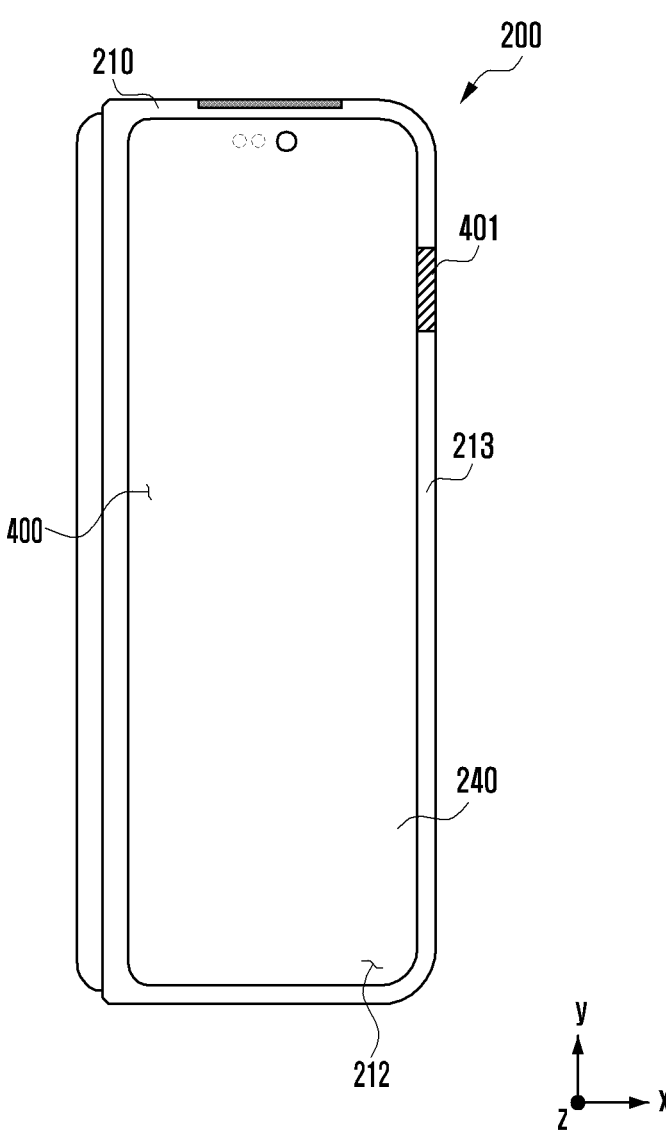
FIG. 4B is a view illustrating a surface in which a sub display is disposed in an electronic device in a folded state according to an embodiment of the disclosure.

FIG. 4B is an example view illustrating a surface (e.g., the second surface 212 in FIG. 2A) in which a sub display 400 is disposed in an electronic device 200 in a folded state according to an embodiment of the disclosure.

FIG. 4B illustrates the first rear cover 240 disposed on the second surface 212 of the first housing 210 of the electronic device 200. The first rear cover 240 may include a sub display 400 (e.g., the second display 400 in FIG. 2A). The first housing 210 may include a first surface 211 (e.g., the first surface 211 in FIG. 2A) disposed to face the front surface of the electronic device 200, a second surface 212 facing a direction opposite to the first surface 211, and/or a first lateral member 213 surrounding at least a portion of a space between the first surface 211 and the second surface 212.

According to an embodiment, in the electronic device 200, a first antenna 401 may be disposed in the first housing 210 and disposed adjacent to the first lateral member 213. As the first antenna 401 is disposed adjacent to an upper (e.g., +y direction) area of the first lateral member 213, deterioration of communication quality of the first antenna 401 may be prevented.

Figure 4C:
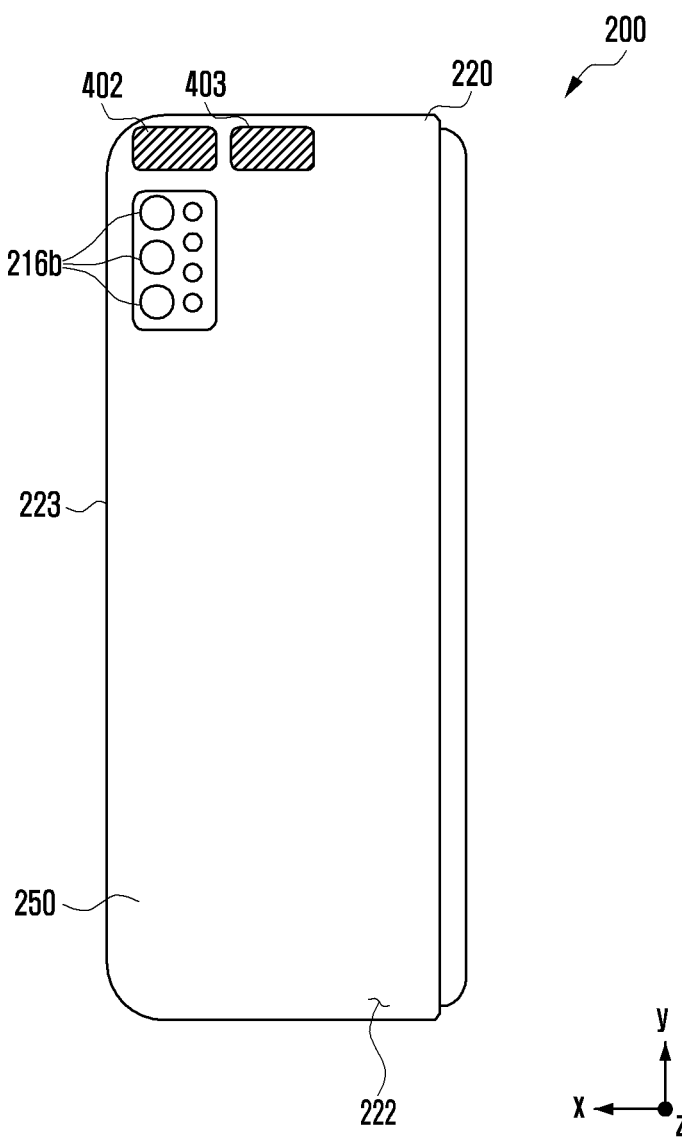
FIG. 4C is an example view illustrating a surface in which a camera module is disposed in an electronic device in a folded state according to an embodiment of the disclosure.

FIG. 4C is an example view illustrating a rear surface (e.g., the fourth surface 222 in FIG. 2A) of the second housing 220 in an electronic device 200 in a folded state according to an embodiment of the disclosure.

FIG. 4C illustrates the second rear cover 250 disposed on the fourth surface 222 of the second housing 220 of the electronic device 200. The second rear cover 250 may include a camera module (e.g., the camera module 216a, 216b, or 225 in FIG. 2A). The second housing 220 may include a third surface 221 (e.g., the third surface 221 in FIG. 2A) disposed to face the front surface of the electronic device 200, a fourth surface 222 facing a direction opposite to the third surface 0221, and/or a second lateral member 223 surrounding at least a portion of a space between the third surface 221 and the fourth surface 222.

According to an embodiment, in the electronic device 200, a second antenna 402 and a third antenna 403 may be disposed in the second housing 220 and disposed adjacent to the second rear cover 250. The second antenna 402 and the third antenna 403 may be arranged adjacent to an upper (e.g., the +y direction) area of the second rear cover 250.

Figure 4D:
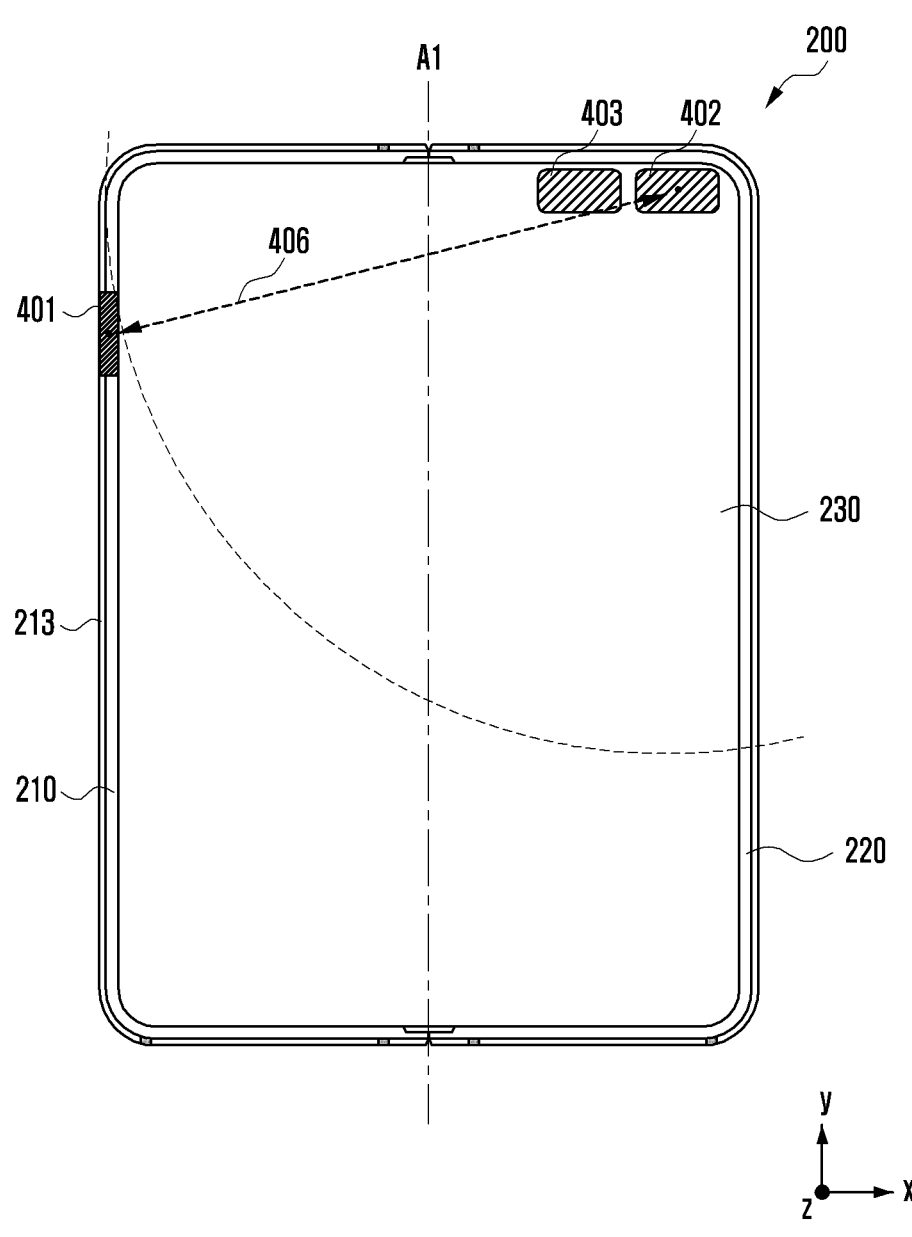
FIG. 4D is an example view illustrating a surface in which a display is disposed in an electronic device in an unfolded state according to an embodiment of the disclosure.

FIG. 4D is a view illustrating a surface in which a display (e.g., a main display) is disposed in an electronic device 200 in an unfolded state according to an embodiment of the disclosure.

According to an embodiment, the electronic device 200 may include a first display (e.g., the first display 230 in FIG. 2A or a main display) disposed to correspond to the front surface thereof and a second display (e.g., the second display 400 in FIG. 2A or a sub display) disposed to correspond to at least a partial area of the rear surface thereof. For example, the front surface of the electronic device 200 may be defined by a surface corresponding to the first surface 211 of the first housing 210 and the third surface 221 of the second housing 220 in the unfolded state of the electronic device 200. The rear surface of the electronic device 200 may be defined by a surface corresponding to the second surface 212 of the first housing 210 and the fourth surface 222 of the second housing 220 in the unfolded state of the electronic device 200.

FIG. 4D is a view illustrating the first display 230 of the front surface in the unfolded state of the electronic device 200.

Referring to FIG. 4D, the first housing 210 of the electronic device 200 may include the first antenna 401 at least partially formed adjacent to an upper (e.g., the +y direction) area of the first lateral member 213. The second housing 220 of the electronic device 200 may include the second antenna 402 and the third antenna 403 disposed adjacent to an upper (e.g., the +y direction) area of the fourth surface 222.

According to an embodiment, in case of performing positioning by using the first antenna 401 and the second antenna 402 in the electronic device 200 in the unfolded state, the first antenna 401 and the second antenna 402 may be disposed spaced a predetermined distance apart from each other to secure positioning accuracy. According to an embodiment, in case of performing positioning by using UWB antennas, the antennas need to be disposed spaced a predetermined distance 406 apart from each other to secure positioning accuracy. For example, the predetermined distance may be measured by using [1/BW (band width)*PLL value]. For example, in case that a UWB communication frequency uses a frequency band of about 500 MHZ and a phase locked loop (PPL) with an error of about 10%, it may give that ⅕₀₀ MHZ=2 ns and 2 ns*0.1=0.2 ns. In addition, 0.2 ns may be calculated to show that the first antenna 401 and the second antenna 402 are disposed spaced about 6 cm or more apart from each other. According to an embodiment, in the electronic device 200 in the folded state, the first antenna 401 and the second antenna 402 may be designed to be disposed spaced about 6 cm or more (e.g., an error range) apart from each other to enhance positioning accuracy. According to an embodiment, as the frequency band increases and PPL with high accuracy is used, the error range may be further reduced and a minimum spacing distance between the first antenna 401 and the second antenna 402 may be reduced.

Figure 4E:
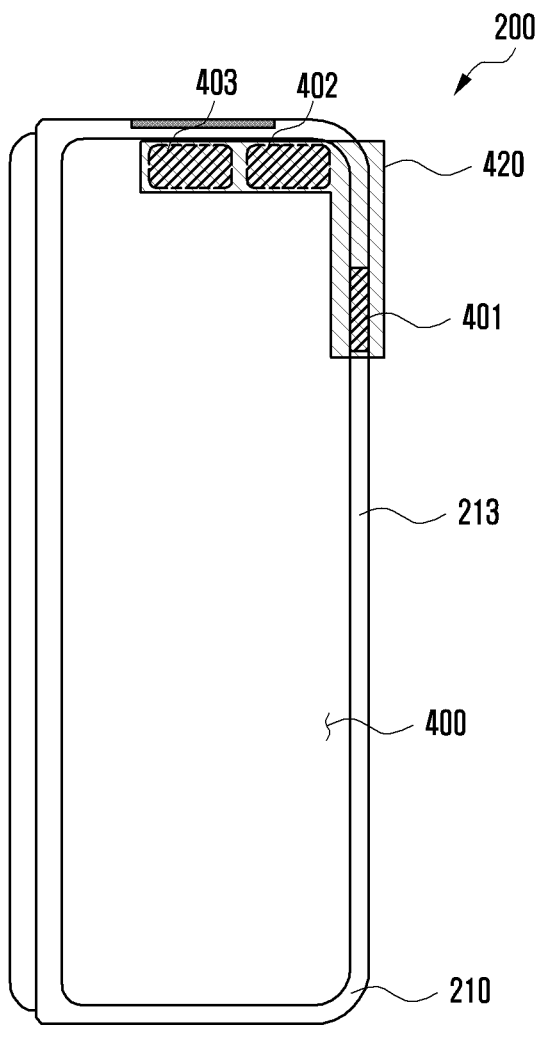
FIG. 4E is a first example view illustrating multiple antennas arranged in a "¬" shape in an electronic device in a folded state according to an embodiment of the disclosure.
Figure 4E:
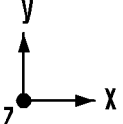

FIG. 4E is a first example view illustrating multiple antennas arranged in a "¬" shape in an electronic device in a folded state according to an embodiment of the disclosure.

FIG. 4E illustrates a second display (e.g., the second display 400 in FIG. 2A or a sub display) disposed in the first housing 210 with respect to the electronic device 200 in the folded state. According to an embodiment, the first housing 210 of the electronic device 200 may include the first antenna 401 disposed adjacent to an upper area of the first lateral member 213. According to an embodiment, the second housing (e.g., the second housing 220 in FIG. 2A) of the electronic device 200 may include the second antenna 402 and the third antenna 403 disposed adjacent to an upper area of a fourth surface (e.g., the fourth surface 222 in FIG. 2A).

Referring to FIG. 4E, the first antenna 401, the second antenna 402, and the third antenna 403 may be designed to be arranged in a "1" shape 420. According to an embodiment, with respect to performing a positioning operation based on the UWB communication method, multiple antennas need to be arranged in parallel on the same axis. For example, the first antenna 401 and the second antenna 402 may be designed to be arranged based on the vertical direction (e.g., the Y-axis direction) and the second antenna 402 and the third antenna 403 may be designed to be arranged in the horizontal direction (e.g., the X-axis direction). According to an embodiment, when performing UWB communication, the electronic device 200 may perform UWB communication in one mode from among two operation modes (for example, a portrait mode (or vertical mode) and/or a landscape mode (or horizontal mode). According to an embodiment, the electronic device 200 may perform a positioning operation based on the second antenna 402 and the third antenna 403 in a portrait mode (a vertical mode) and perform a positioning operation based on the first antenna 401 and the second antenna 402 in a landscape mode (a horizontal mode). The electronic device 200 may perform a UWB communication-based positioning operation by using at least two antennas arranged based on an axial direction corresponding to the horizontal line. According to an embodiment, the electronic device 200 may include a 9-axis motion sensor, generate a virtual coordinate space based on an azimuth angle (or yaw), pitch, and/or roll value measured by the 9-axis motion sensor, divide an area of the coordinate space into a landscape range, and divide another area of the coordinate space into a portrait range. The electronic device 200 may detect whether a state of the electronic device is in the landscape mode or the portrait mode based on that a current state of the electronic device falls within the landscape range or the portrait range.

Figure 4F:
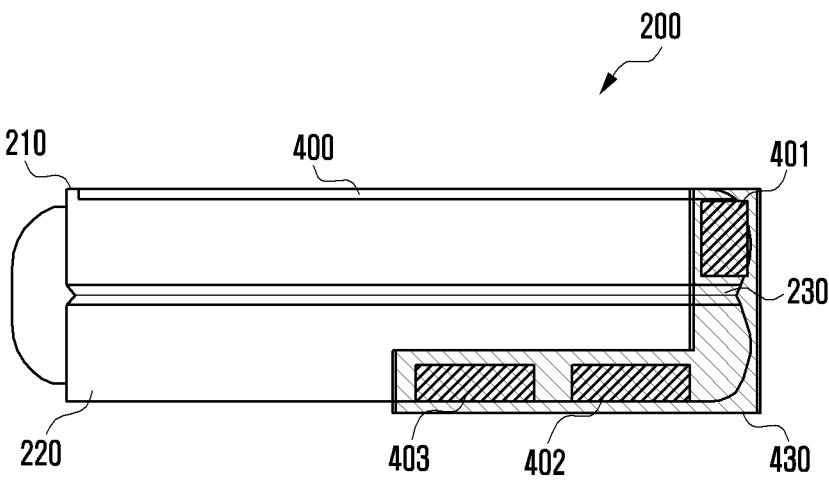
FIG. 4F is a second example view illustrating multiple antennas arranged in a "¬" shape in an electronic device in a folded state according to an embodiment of the disclosure.
Figure 4F:
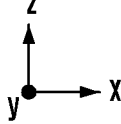

FIG. 4F is a second example view illustrating multiple antennas arranged in a "¬" shape in an electronic device in a folded state according to an embodiment of the disclosure.

FIG. 4F illustrates a sectional view of the electronic device 200 in the folded state viewed from above. In the electronic device 200, the first antenna 401 may be disposed in the first housing 210, and the second antenna 402 and the third antenna 403 may be disposed in the second housing 220. The first housing 210 may include the second display 400 and the first antenna 401 may be disposed on the first lateral member 213.

Referring to FIG. 4F, the first antenna 401, the second antenna 402, and the third antenna 403 may be designed to be arranged in a "¬" shape 430. According to an embodiment, with respect to performing a positioning operation based on the UWB communication method, multiple antennas need to be arranged in parallel on the same axis. For example, the first antenna 401 and the second antenna 402 may be designed to be arranged based on the vertical direction (e.g., the Y-axis direction) and the second antenna 402 and the third antenna 403 may be designed to be arranged in the horizontal direction (e.g., the X-axis direction). According to an embodiment, the electronic device 200 may perform a UWB communication-based positioning operation by using two antennas positioned on the same axis. According to another embodiment, in case of measuring three-dimensional direction information (e.g., three dimensional (3D) AOA) (capable of measuring both up and down, left and right) with respect to an external electronic device, the electronic device 200 may activate all of the first antenna 401 to the third antenna 403 regardless of a mode of the electronic device and receive a response signal. The electronic device 200 may measure up and down directions (or left and right directions) by using data received through the first antenna 401 and/or the second antenna 402 and measure left and right directions (or up and down directions) by using data received through the second antenna 402 and/or the third antenna 403. The electronic device 200 may identify a three-dimensional position (e.g., a position of an external electronic device in a three-dimensional space with reference to the electronic device 200) of an external electronic device based on the measured up and down directions and/or the measured left and right directions.

Various embodiments may provide an electronic device (e.g., the electronic device 200 in FIG. 2A) including a foldable housing, wherein the foldable housing includes a hinge module (e.g., the hinge module 264 in FIG. 3), a first housing (e.g., the first housing 210 in FIG. 2A) which is connected to the hinge module 264 and includes a first surface (e.g., the first surface 211 in FIG. 2A) facing a first direction, a second surface (e.g., the second surface 212 in FIG. 2A) facing a second direction opposite to the first direction, and a first antenna (e.g., the first antenna 401 in FIG. 4A) configured to support a first frequency band, and a second housing (e.g., the second housing 220 in FIG. 2A) which is connected to the hinge module 264, includes a third surface (e.g., the third surface 221 in FIG. 2A) facing a third direction, a fourth surface (e.g., the fourth surface 222 in FIG. 2A) facing a fourth direction opposite to the third direction, and a second antenna (e.g., the second antenna 402 in FIG. 4A) configured to support the first frequency band, and is folded to the first housing 210 around the hinge module 264. In the electronic device 200, in a folded state in which the first surface faces the third surface, the first antenna 401 and the second antenna 402 may be arranged to be spaced apart from each other by half a wavelength corresponding to the first frequency band, and in an unfolded state in which the first direction and the third direction are the same direction, the first antenna 401 and the second antenna 402 may be arranged to be spaced apart from each other by an error range or more, the error range corresponding to the first frequency.

According to an embodiment, the first antenna 401 and the second antenna 402 may support a high frequency band corresponding to the UWB communication method.

According to an embodiment, the foldable housing may further include a third antenna (e.g., the third antenna 403 in FIG. 4A) configured to support the first frequency band in the second housing, the second antenna 402 and the third antenna 403 may be arranged based on a first axis, and in the folded state in which the first surface faces the third surface, the first antenna 401 and the second antenna 402 may be arranged based on a second axis formed perpendicular to the first axis.

According to an embodiment, in the unfolded state in which the first direction and the third direction is the same direction, the first antenna 401 and the second antenna 402 may be arranged spaced a configured distance or more apart from each other, wherein the configured distance may be determined based on the first frequency band and a phase lock loop (PPL) and may be reduced as the first frequency band increases and a phase lock loop with high accuracy is used.

Figure 5:
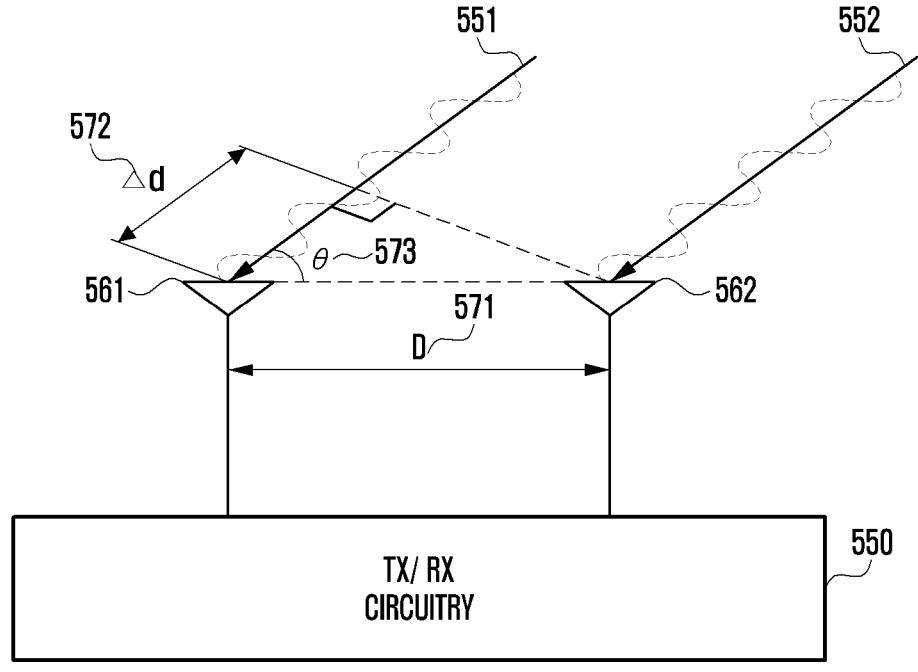
FIG. 5 is an example view of a method for performing a positioning operation by using multiple antennas according to an embodiment of the disclosure.

FIG. 5 is an example view of a method for performing a positioning operation by using multiple antennas (e.g., a first antenna and/or a second antenna) according to an embodiment of the disclosure.

According to various embodiments, the electronic device 200 configured to support the UWB communication method may measure positions (e.g., a spacing distance from and/or an angle (angle of arrival (AoA)) of the electronic device 200 and an external electronic device (e.g., a counterpart device performing UWB communication with the electronic device 200) by using the first antenna 561 (e.g., the first antenna 401 in FIG. 4A) and the second antenna 562 (e.g., the second antenna 402 in FIG. 4A).

Referring to FIG. 5, the first antenna 561 and the second antenna 562 of the electronic device 200 may be operatively connected to a transmission/reception circuit 550 (e.g., transmitter (TX)/receiver (RX) circuitry) for UWB communication. According to an embodiment, the electronic device 200 may store a distance D 571 by which the first antenna 561 and the second antenna 562 are spaced apart from each other in a memory (e.g., the memory 130 in FIG. 1). The electronic device 200 may calculate a reception time difference between a first signal 551 received through the first antenna 561 and a second signal 552 received through the second antenna 562 and calculate an arrival distance difference Δd 572 from an external electronic device based on the reception time difference. For example, the first signal 551 and the second signal 552 may be defined as response signals transmitted from the same external electronic device. According to an embodiment, the arrival distance difference Δd 572 may be determined by a function of a phase difference Δφ between the first signal 551 received through the first antenna 561 and the second signal 552 received through the second antenna 562. According to an embodiment, by using Equation 1 and Equation 2 described below, the phase difference between the electronic device 200 and an external electronic device may be identified, and an angle of arrival (AoA) 573 may be measured based on the phase difference. The AoA may be measured by reflecting a value measured using (Equation 1) and a value measured using (Equation 2) into (Equation 3). According to an embodiment, the measuring of AoA may be defined as performing a positioning operation with respect to the electronic device 200 and an external electronic device.

$$D = \Delta d^* \cos \theta \qquad \text{Equation 1}$$

$$\Delta \varphi = 2\Pi/\lambda^* \Delta d \qquad \text{Equation 2}$$

$$AoA(\theta) = \cos^{-1} \Delta \varphi / 2\Pi D/\lambda \qquad \text{Equation 3}$$

Figure 6:
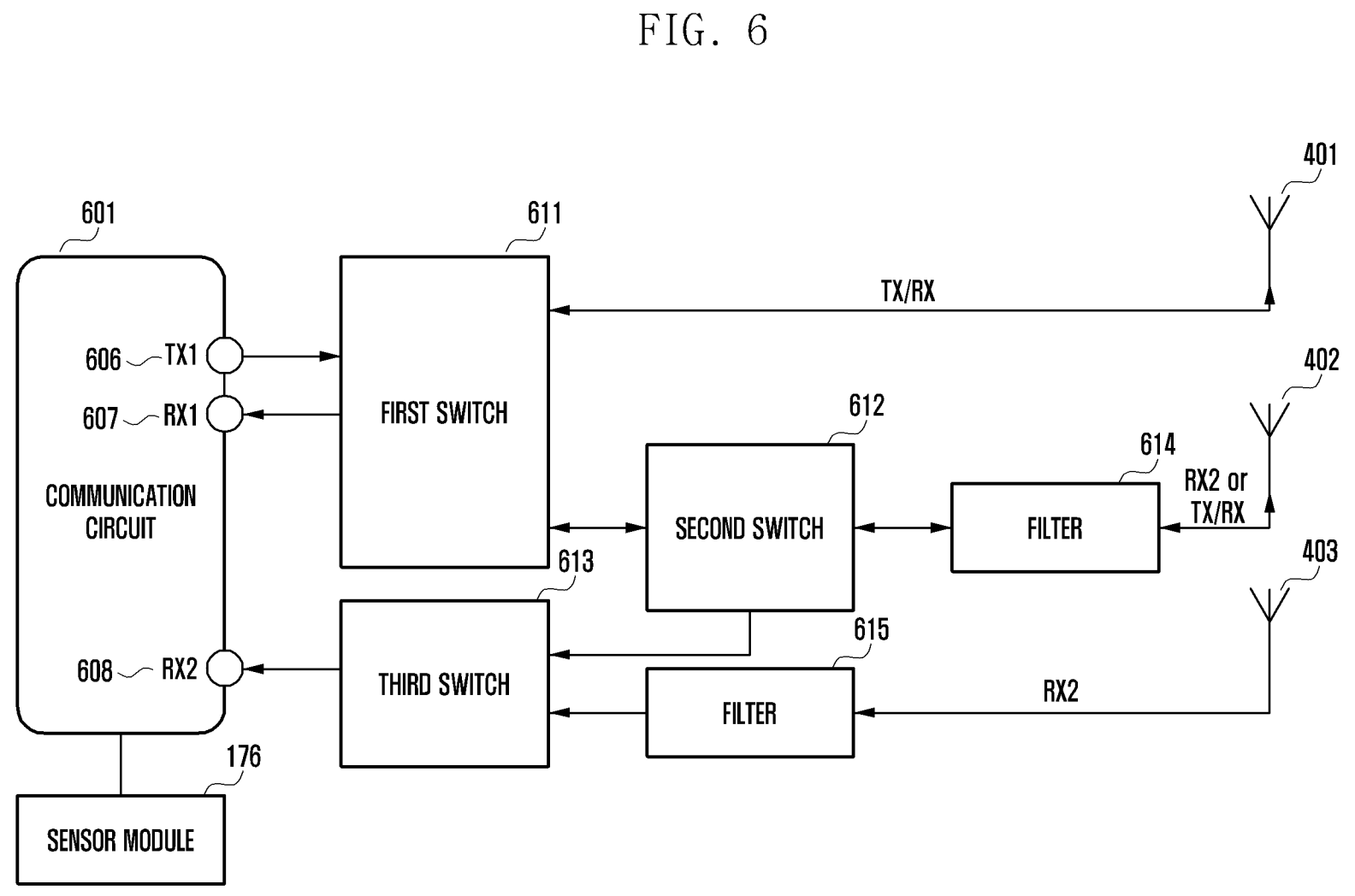

FIG. 6 is a block diagram of an electronic device including multiple antennas according to an embodiment of the disclosure.

According to various embodiments, an electronic device (e.g., the electronic device 200 in FIG. 2A) configured to support the UWB communication method may measure positions (e.g., a spacing distance from and/or an angle (angle of arrival (AoA)) of the electronic device 200 and an external electronic device (e.g., a counterpart device performing UWB communication with the electronic device 200) by using multiple antennas. The UWB communication method may be a method for performing wireless communication based on a frequency band of about 6.25 GHz to 8.25 GHz and the multiple antennas may be designed to support the corresponding frequency band.

Referring to FIG. 6, the electronic device 200 may include a communication circuit 601 for performing UWB communication, multiple antennas (e.g., a first antenna (e.g., the first antenna 401 in FIG. 4A), a second antenna (e.g., the second antenna 402 in FIG. 4A, and/or a third antenna (e.g., the third antenna 403 in FIG. 4A)), and/or a sensor module (e.g., the sensor module 176 in FIG. 1). The electronic device 200 may include multiple switches (e.g., a first switch 611, a second switch 612, and/or a third switch 613) for selecting one of the multiple antennas and/or multiple filters 614 and 615. According to various embodiments, the number of components constituting the electronic device 200 is not limited to FIG. 6 and connection configuration and the number may be variously implemented. According to an embodiment, the first antenna 401, the second antenna 402, the third antenna 403, and/or the filter 614 or 615 may be included in an antenna module (e.g., the antenna module 197 in FIG. 1).

Referring to FIG. 6, the communication circuit 601 of the electronic device 200 may include a transmission terminal (TX1 terminal 606) for transmitting a UWB signal and a reception terminal (RX1 terminal 607 or RX2 terminal 608) for receiving a UWB signal. According to an embodiment, the number of transmission/reception terminals is not limited to FIG. 6. According to an embodiment, the communication circuit 601 of the electronic device 200 may control the first switch 611 to transmit and receive a UWB signal through the first antenna 401. According to an embodiment, the communication circuit 601 of the electronic device 200 may control the first switch 611, the second switch 612, the third switch 613, and the filter 614 to transmit and receive a UWB signal through the second antenna 402. According to an embodiment, the communication circuit 601 of the electronic device 200 may control the third switch 613 and the filter 615 to receive a UWB signal through the third antenna 403.

According to an embodiment, the electronic device 200 may transmit a UWB signal through the communication circuit 601 by using the first antenna 401 and the second antenna 402 and receive a UWB signal by selecting at least one of the first antenna 401, the second antenna 402, and the third antenna 403. The electronic device 200 may perform a positioning operation based the received UWB signal.

For example, the communication circuit 601 may control the first switch 611 connected to the TX1 terminal 606 to transmit a UWB signal through the first antenna 401. The communication circuit 601 may transmit a UWB signal through the first switch 611 connected to TX1 terminal 606, the second switch 612 connected to the first switch 611, the filter 614 connected to the second switch 612, and the second antenna 402. The electronic device 200 is in a state of performing UWB communication with an external electronic device based on the UWB communication method and may transmit a UWB signal to the external electronic device. According to an embodiment, in a folded state (e.g., a folding state) of the electronic device 200, the electronic device 200 may transmit a UWB signal by using one of the first antenna 401 and/or the second antenna 402 and in an unfolded state (e.g., an unfolding state) of the electronic device 200, may transmit a UWB signal in response to each based on the first antenna 401 and/or the second antenna 402. According to an embodiment, the electronic device 200 may identify a state (e.g., the folding state and/or the unfolding state) of the electronic device 200 and the number of transmission antennas for transmitting a UWB signal may be determined based on the state of the electronic device 200.

For example, the communication circuit 601 may receive a UWB signal through the first switch 611 connected to RX1 terminal 607, the second switch 612 connected to the first switch 611, and the filter 614 connected to the second switch 612. The communication circuit 601 may receive a UWB signal through the third switch 613 connected to RX2 terminal 608, and the filter 615 connected to the third switch 613. The electronic device 200 is in a state of performing UWB communication with an external electronic device based on the UWB communication method and may receive a UWB signal from the external electronic device. For example, the electronic device 200 may transmit a UWB signal to an external electronic device and receive a UWB signal from the external electronic device in response to the transmission signal.

According to an embodiment, the sensor module (e.g., the sensor module 176 in FIG. 1) of the electronic device 200 may detect whether the electronic device 200 is in the folded state or the unfolded state. The electronic device 200 may detect a state of the electronic device 200 by using the sensor module 176 and select at least one antenna for transmitting a UWB signal based on the state of the electronic device. Furthermore, the electronic device 200 may determine at least two antennas to be used for performing a positioning operation based on the state of the electronic device 200. For example, the electronic device 200 may transmit a UWB signal by selecting at least one of the first antenna 401 and the second antenna 402 which support UWB signal transmission. The electronic device 200 may receive a UWB signal by selecting at least one of the second antenna 402 and the third antenna 403 which support UWB signal reception.

According to various embodiments, the electronic device 200 may perform UWB communication by using multiple antennas and measure positions (e.g., a spacing distance from and/or an angle (angle of arrival (AoA)) of the electronic device 200 and an external electronic device based on two reception signals (e.g., UWB signals transmitted by an external electronic device) according to the UWB communication.

An electronic device according to various embodiments may include a sensor module (e.g., the sensor module 176 in FIG. 6) for detecting a folding mode in which a first housing (e.g., the first housing 210 in FIG. 2A) and a second housing (e.g., the second housing 220 in FIG. 2A) are folded around a hinge module (e.g., the hinge module 264 in FIG. 3) and an unfolding mode in which the first housing 210 and the second housing 220 are unfolded, a first antenna (e.g., the first antenna 401 in FIG. 6) disposed in the first housing 210 and capable of transmitting and receiving a signal based on a first frequency band, a second antenna (e.g., the second antenna 402 in FIG. 6) disposed in the second housing 220 and capable of transmitting and receiving a signal based on the first frequency band, and a processor (e.g., the processor 120 in FIG. 1) operatively connected to the sensor module 176, the first antenna 401, and the second antenna 402. The processor 120 may identify the folding mode from among the folding mode and the unfolding mode by using the sensor module 176, transmit a first signal to an external electronic device through the first antenna 401, receive a first response signal to the first signal by using the first antenna 401, measure a first phase value corresponding to the received first response signal, receive a second response signal to the first signal based on the second antenna 402, measure a second phase value corresponding to the received second response signal, and perform a positioning operation with respect to the external electronic device based on the first phase value and the second phase value.

According to an embodiment, the processor 120 may identify a phase difference based on the first phase value and the second phase value and identify a spacing distance from and an angle with respect to the external electronic device based on the identified phase difference.

According to an embodiment, the electronic device may further include a first switch (e.g., the first switch 611 in FIG. 6) connected to the first antenna 401, and a second switch (e.g., the second switch 612 in FIG. 6) connected to the first antenna 401 and the second antenna 402, and the processor 120 may identify the folding mode from among the folding mode and the unfolding mode by using the sensor module 176, control the first switch 611 to transmit a first signal to the external electronic device through the first antenna 401, control the first switch 611 and the second switch 612 to receive a first response signal to the first signal based on the first antenna 401, measure a first reception time of the first response signal, control the first switch 611 and the second switch 612 to receive a second response signal to the first signal based on the second antenna 402, measure a second reception time of the second response signal, and perform a positioning operation with respect to the external electronic device based on the first reception time and the second reception time.

According to an embodiment, the processor 120 may identify a phase difference based on the first phase value and the second phase value and identify a spacing distance from and an angle with respect to the external electronic device based on the identified phase difference.

According to an embodiment, the processor 120 may identify the unfolding mode from among the folding mode and the unfolding mode by using the sensor module 176, control the first switch 611 to transmit a first signal to the external electronic device through the first antenna 401, control the first switch 611 and the second switch 612 to receive a first response signal to the first signal based on the first antenna 401, measure a first reception time of the first response signal, control the first switch 611 and the second switch 612 to receive a second response signal to the first signal based on the second antenna 402, measure a second reception time of the second response signal, and perform a positioning operation with respect to the external electronic device based on the first reception time and the second reception time.

According to an embodiment, the processor 120 may identify a reception time difference based on the first reception time and the second reception time and identify a spacing distance from and an angle with respect to the external electronic device based on the identified reception time difference.

According to an embodiment, the processor 120 may identify a trajectory indicating a predicted position of the external electronic device based on the identified reception time difference, determine a position of the external electronic device based on the identified trajectory, and identify an angle of the external electronic device corresponding to the determined position.

According to an embodiment, the electronic device 200 may further include an amplifying circuit between the first antenna 401 and the first switch 611. When transmitting or receiving a signal through the first antenna 401, the processor 120 may amplify the signal by using the amplifying circuit.

According to an embodiment, the electronic device 200 may further include a third antenna (e.g., the third antenna 403 in FIG. 4A) capable of receiving a signal based on the first frequency band in the second housing 220. The processor may receive a first response signal by using the second antenna 402 and receive a second response signal by using the third antenna 403.

Figure 7A:
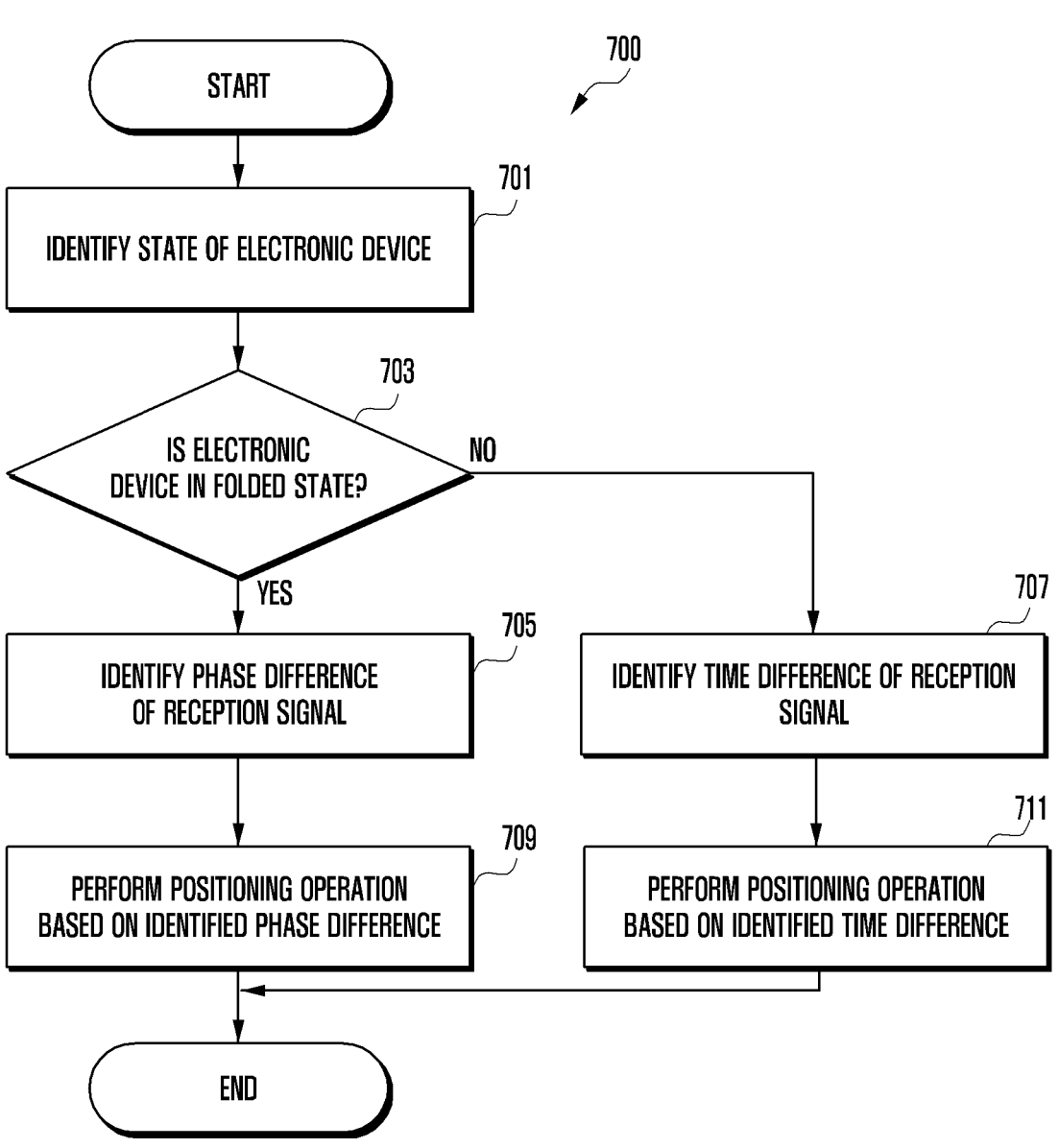
FIG. 7A is a flowchart illustrating a method for measuring a position based on an antenna according to an embodiment of the disclosure.

FIG. 7A is a flowchart 700 illustrating a method for measuring a position based on an antenna according to an embodiment of the disclosure.

According to various embodiments, in an electronic device (e.g., the electronic device 101 in FIG. 1) including multiple housings (e.g., the first housing 210 and the second housing 220 in FIGS. 2A and 2B), multiple antennas (e.g., the first antenna 401, the second antenna 402, and/or the third antenna 403 in FIG. 4A) may be distributively arranged in different housings. For example, the first antenna 401 may be disposed in the first housing 210 and the second antenna 402 and the third antenna 403 may be disposed in the second housing 220. The electronic device 101 may include a foldable electronic device in which the first housing 210 and the second housing 220 are folded to each other. According to an embodiment, in the folded state, the electronic device 101 may measure a phase difference by using the first antenna 401 and the second antenna 402 and perform a positioning operation based on the phase difference. According to an embodiment, in the unfolded state, the electronic device 101 may measure a reception time difference with respect to a response signal by using the first antenna 401 and the second antenna 402 and perform a positioning operation based on the reception time difference. According to an embodiment, the electronic device 101 may perform positioning operations in different methods (e.g., a phase difference method and/or a reception time difference method) depending on a state of the electronic device 101 and maintain positioning accuracy.

In operation 701, the electronic device 101 may identify a state of the electronic device 101 by using a sensor module (e.g., the sensor module 176 in FIG. 1). For example, the state of the electronic device 101 may include a folded state (e.g., a folding state) in which the first housing 210 and the second housing 220 of the electronic device 101 are folded around a folding axis (e.g., the folding axis A1 in FIG. 2A) and an unfolded state in which the first housing 210 and the second housing 220 are unfolded. The unfolded state may be defined as a state in which a first surface (e.g., the first surface 211 in FIG. 2A) of the first housing 210 and a third surface (e.g., the third surface 221 in FIG. 2A) of the second housing 220 face substantially the same direction. According to another embodiment, the state of the electronic device 101 may include a vertical mode state (e.g., a portrait mode) and/or a horizontal mode state (e.g., a landscape mode).

In operation 703, the electronic device 101 may identify whether the electronic device 101 is in the folded state. According to an embodiment, in case that the electronic device 200 is in the folded state, the first antenna 401 may be spaced $\lambda/2$ (e.g., $\lambda/2$ 405 in FIG. 4A) apart from the second antenna 402. The electronic device 101 in the folded state may measure a phase difference with respect to a reception signal by using the first antenna 401 and the second antenna 402 and perform a positioning operation based on the measured phase difference. According to an embodiment, in case that the electronic device 101 is in the unfolded state, the first antenna 401 may be spaced a predetermined distance apart from the second antenna 402. For example, the predetermined distance is shown in the detailed description with respect to FIG. 4D. The electronic device 101 in the unfolded state may measure a reception time difference with respect to a reception signal by using the first antenna 401 and the second antenna 402 and perform a positioning operation based on the measured reception time difference.

In case that the electronic device 101 is in the folded state in operation 703, in operation 705, the electronic device 101 may identify a phase difference of reception signals. For example, the electronic device 101 (e.g., a first electronic device) may be in a state of performing UWB communication with an external electronic device (e.g., a second electronic device). The first electronic device may transmit a UWB signal to the second electronic device and receive a response signal to the UWB signal from the second electronic device. The first electronic device may transmit a signal to the second electronic device and receive a signal corresponding to a response signal to the transmission signal from the second electronic device. The first electronic device may receive the reception signal by using the first antenna 401 and the second antenna 402. A phase difference may occur between a first reception signal through the first antenna 401 and a second reception signal through the second antenna 402. According to an embodiment, the electronic device 101 may measure a phase difference between the first reception signal received through the first antenna 401 and the second reception signal received through the second antenna 402.

In operation 709, the electronic device 101 may perform a positioning operation (e.g., an operating of calculating an angle of arrival (AoA)) with respect to the first electronic device and the second electronic device based on the phase difference. For example, by performing a positioning operation, the electronic device 101 may identify a position of the electronic device 101, a position of an external electronic device (e.g., an external electronic device in UWB communication with the electronic device 101), and/or an angle between the electronic device 101 and an external electronic device.

Referring to FIG. 5, the electronic device 101 may calculate a phase difference between the first reception signal and the second reception signal by using the first antenna 401 (e.g., the first antenna 561 in FIG. 5) and the second antenna 402 (e.g., the second antenna 562 in FIG. 5). The electronic device 101 may perform a positioning operation with respect to the electronic device 101 and the external electronic device based on the phase difference.

In case that the electronic device 101 is in the unfolded state in operation 703, the electronic device 101 may identify a reception time difference of reception signals in operation 707. For example, the electronic device 101 (e.g., a first electronic device) may be in a state of performing UWB communication with an external electronic device (e.g., a second electronic device). The first electronic device may transmit a UWB signal to the second electronic device and receive a response signal to the UWB signal from the second electronic device. The first electronic device may transmit a signal to the second electronic device and receive a reception signal corresponding to a response signal to the transmission signal from the second electronic device. The first electronic device may receive the reception signal by using the first antenna 401 and the second antenna 402. For example, in the electronic device 101 in the unfolded state, the first antenna 401 may be positioned spaced a predetermined distance apart from the second antenna 402. A reception time difference may occur between a first reception signal through the first antenna 401 and a second reception signal through the second antenna 402. According to an embodiment, the electronic device 101 may measure a reception time difference between the first reception signal received through the first antenna 401 and the second reception signal received through the second antenna 402.

In operation 711, the electronic device 101 may perform a positioning operation with respect to the first electronic device and the second electronic device based on the reception time difference. For example, by performing a positioning operation, the electronic device 101 may identify a position of the electronic device 101, a position of an external electronic device (e.g., an external electronic device in UWB communication with the electronic device 101), and/or an angle between the electronic device 101 and an external electronic device. FIGS. 8A, 8B, 9A, 9B, 10A, and 10B illustrate a process in which a positioning operation is performed by using a reception time difference.

Figure 7B:
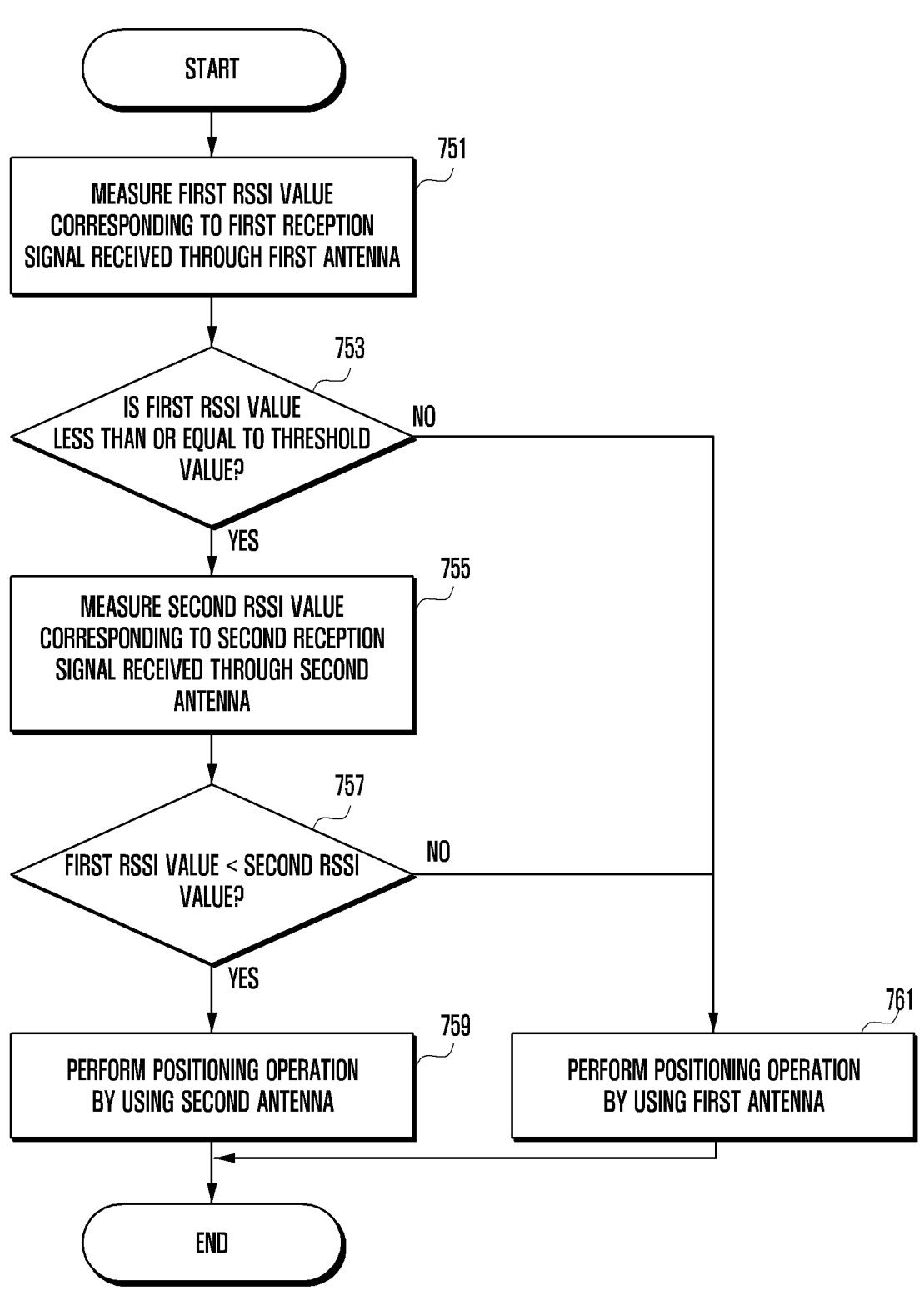
FIG. 7B is a flowchart illustrating a method for determining an antenna for performing positioning based on a strength of a reception signal through an antenna according to an embodiment of the disclosure.

FIG. 7B is a flowchart illustrating a method for determining an antenna for performing positioning based on a strength of a reception signal through an antenna according to an embodiment of the disclosure. FIG. 7B illustrates, when a positioning operation is performed, a process in which a reception signal strength (e.g., received signal strength indication (RSSI)) is measured and a positioning operation is performed by using an antenna showing a large reception signal strength measured thereby.

According to various embodiments, in case of measuring a distance to an external electronic device, an electronic device (e.g., the electronic device 101 in FIG. 1) may measure a reception signal strength (RSSI) corresponding to at least one antenna and determine at least one antenna to be used for a positioning operation based on the measured reception signal strength. The electronic device 101 may include multiple antennas and a strength of a received signal may vary depending on an arrangement position of antennas. According to an embodiment, the electronic device 101 may measure a reception signal strength corresponding to each antenna and accuracy of a positioning operation may be enhanced by determining at least one antenna used for a positioning operation based on a reception signal strength.

Referring to FIG. 7B, in the folded state, the electronic device 101 may be in a state of receiving a response signal for distance measurement (e.g., a ranging operation). For example, the electronic device 101 may be in a state of transmitting a signal for distance measurement to an external electronic device and receiving a response signal thereof from the external electronic device.

In operation 751, the electronic device 101 may measure a first RSSI value corresponding to a first reception signal (e.g., a response signal received through the first antenna 401) received through a first antenna (e.g., the first antenna 401 in FIG. 4A). According to an embodiment, depending on a position of the electronic device 101 and an arrangement position of the first antenna 401, a strength of the first reception signal may be measured differently. For example, in case that the electronic device 101 is in a bag, a user grips the electronic device 101 with a hand, or the first antenna 401 is in contact with a human body, a strength of the first reception signal may be measured low. According to an embodiment, the electronic device 101 may measure a first RSSI value corresponding to a first reception signal while performing a distance measurement operation by using the first antenna 401.

In operation 753, the electronic device 101 may identify whether the measured first RSSI value is lower than or equal to a threshold value. For example, the threshold value is a preconfigured value and may correspond to information stored in a memory (e.g., the memory 130 in FIG. 1). The threshold value may be defined as a reference value of a reception signal for performing a positioning operation. In case that the first RSSI value exceeds the threshold value in operation 753, in operation 761, the electronic device 101 may perform a positioning operation by using the first antenna 401 without changing an antenna.

In case that the first RSSI value is lower than or equal to the threshold value in operation 753, in operation 755, the electronic device 101 may measure a second RSSI value corresponding to a second reception signal (e.g., a response signal receive through the second antenna 402) received through a second antenna (e.g., the second antenna 402 in FIG. 4A).

In operation 757, the electronic 101 may compare the first RSSI value and the second RSSI value and identify whether the second RSSI value of the second antenna 402 is larger than the first RSSI value of the first antenna 401. For example, a case in which the second RSSI value is greater than the first RSSI value may be defined that a signal strength of the second reception signal through the second antenna 402 is greater. According to an embodiment, in order to enhance accuracy of a positioning operation, the electronic device 101 may determine at least one antenna having a relatively greater strength of a reception signal and may perform a positioning operation by sing the determined at least one antenna.

In case that the second RSSI value is greater than the first RSSI value in operation 757, in operation 759, the electronic device 101 may perform a positioning operation by using the second antenna 402. In case that the second RSSI value is smaller than the first RSSI value in operation 757, in operation 761, the electronic device 101 may perform a positioning operation by using the first antenna 401.

According to an embodiment, a situation in which a strength of the response signal is lowered may occur when the electronic device 101 receives a response signal for distance measurement. For example, the situation may include a situation in which the electronic device 101 is in a bag, a situation in which a user grips a position corresponding to an antenna, or a situation in which the antenna is in contact with a human body so that a response signal is difficult to be received from the outside. The electronic device 101 including multiple antennas arranged therein may measure a RSSI value (e.g., a strength of a reception signal) corresponding to each antenna and determine at least one antenna to be used for a positioning operation based on the measured RSSI value. According to another embodiment, the electronic device 101 may measure an RSSI value corresponding to at least one antenna while performing a positioning operation and change an antenna to be used for a positioning operation based on the measured RSSI value.

Figure 8A:
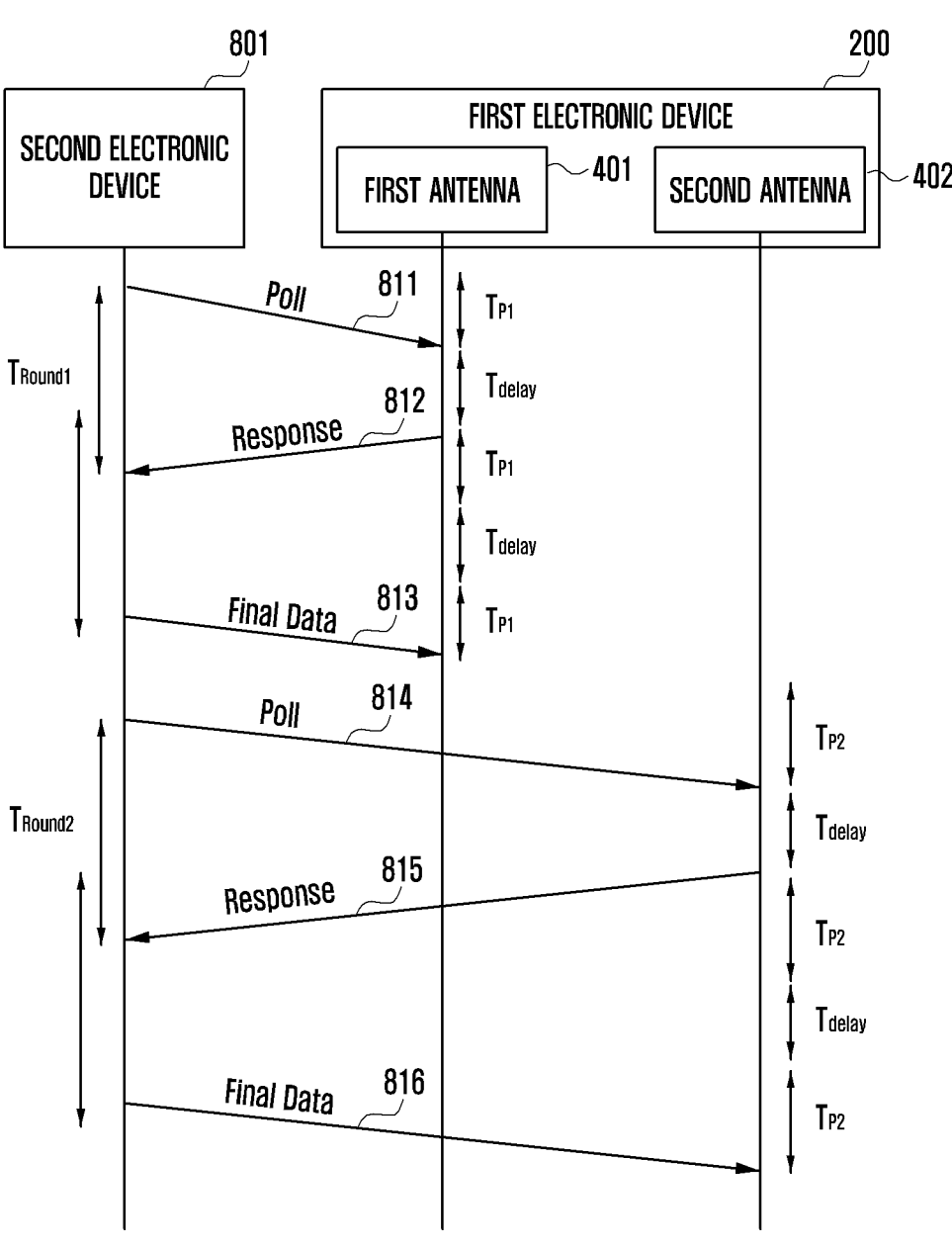
FIG. 8A is a first example view illustrating a process of performing positioning by using a first antenna and a second antenna according to an embodiment of the disclosure.

FIG. 8A is a first example view illustrating a process of performing positioning by using a first antenna and a second antenna according to an embodiment of the disclosure.

According to an embodiment, an electronic device (e.g., the electronic device 200 in FIG. 2A and a first electronic device) may perform wireless communication (e.g., UWB communication) with a second electronic device 801 (e.g., a second electronic device). The first electronic device 200 may include multiple antennas (e.g., the first antenna 401 and the second antenna 402) supporting UWB communication. The first antenna 401 and the second antenna 402 may be designed to transmit and receive a UWB signal.

In operation 811, the first electronic device 200 may receive a first signal (e.g., a poll signal) from the second electronic device 801 by using the first antenna 401. The first electronic device 200 may not identify a reception time of the first signal in a state of not being synchronized with the second electronic device 801. In operation 812, the first electronic device 200 may transmit a second signal (e.g., a response signal) to the second electronic device 801 by using the first antenna 401 after a configured time (e.g., Tdelay) after receiving the first signal. In operation 813, the first electronic device 200 may receive a third signal (e.g., final data) from the second electronic device 801 by using the first antenna 401. According to an embodiment, the first electronic device 200 may measure a first reception time (e.g., Tround1) with respect to the second electronic device 801 based on the first antenna 401.

In operation 814, the first electronic device 200 may receive a first signal (e.g., a poll signal) from the second electronic device 801 by using the second antenna 402. The first electronic device 200 may not identify a reception time of the first signal in a state of not being synchronized with the second electronic device 801. In operation 815, the first electronic device 200 may transmit a second signal (e.g., a response signal) to the second electronic device 801 by using the second antenna 402 after a configured time (e.g., Tdelay) after receiving the first signal. In operation 816, the first electronic device 200 may receive a third signal (e.g., final data) from the second electronic device 801 by using the second antenna 402. According to an embodiment, the first electronic device 200 may measure a second reception time (e.g., Tround2) with respect to the second electronic device 801 based on the second antenna 402.

According to an embodiment, the first electronic device 200 may measure a first reception time based on the first antenna 401 and a second reception time based on the second antenna 402, and perform a positioning operation based on a time difference between the first reception time and the second reception time. According to an embodiment, the first electronic device 200 (e.g., a responder) may receive a first signal (e.g., a poll signal) from the second electronic device 801 (e.g., an initiator). The first electronic device 200 may transmit a second signal (e.g., a response signal) to the second electronic device 801. The first electronic device 200 may receive a third signal (e.g., final data) from the second electronic device 801 and perform a positioning operation with respect to the second electronic device 801. According to an embodiment, a method for performing a positioning operation by the responder (e.g., the first electronic device 200) having received a first signal (e.g., a poll signal) from the initiator may be defined as a double sided two way ranging (DS-TWR) method. According to another embodiment, a method in which the initiator transmits a first signal (e.g., a poll signal) to the responder and the initiator (e.g., the second electronic device 801) performs a positioning operation may be defined as a single sided two way ranging (SS-TWR) method. FIG. 8A illustrates the DS-TWR method in which the first electronic device 200 (e.g., the responder) performs a positioning operation with respect to the second electronic device 801, but is not limited thereto. Although not shown in the drawing, the SS-TWR method in which the second electronic device 801 transmits a first signal (e.g., a poll signal) to the first electronic device 200 and the second electronic device 801 receives a second signal (e.g., a response signal) from the first electronic device 200 and performs a positioning operation may be used. According to various embodiments, with respect to performing a positioning operation with respect to the second electronic device 801, the first electronic device 200 may use at least one of the DS-TWR method and/or the SS-TWR method.

According to an embodiment, the first electronic device 200 may execute an application related to the UWB communication before performing operation 811. In case that an application is executed, the first electronic device 200 may activate wireless communication (e.g., Bluetooth communication (BLE)). Wireless communication may search for nearby electronic devices using near-field communication, for example, Bluetooth communication. The first electronic device 200 may recognize the second electronic device 801 capable of performing UWB communication through a wireless communication module. According to an embodiment, the first electronic device 200 may recognize the second electronic device 801 by using Bluetooth communication and receive a first signal (e.g., a poll signal) from the second electronic device 801 in operation 811.

Figure 8B:
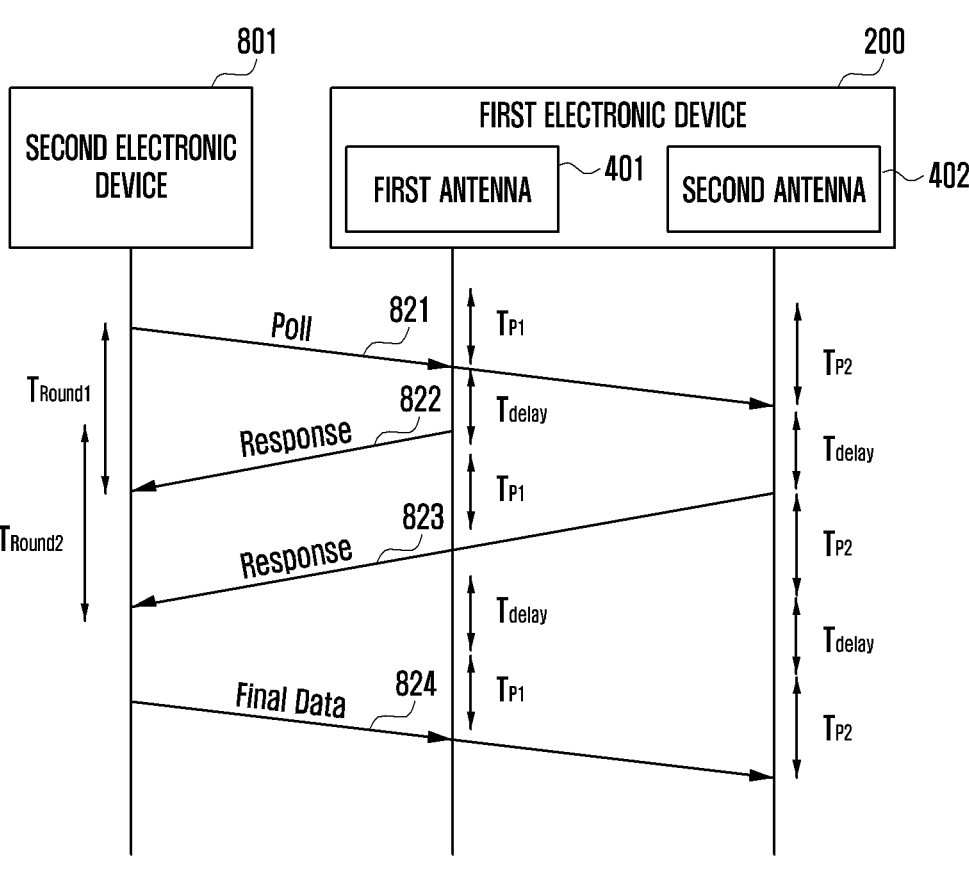
FIG. 8B is a second example view illustrating a process of performing positioning by using a first antenna and a second antenna according to an embodiment of the disclosure.

FIG. 8B is a second example view illustrating a process of performing positioning by using a first antenna and a second antenna according to an embodiment of the disclosure. FIG. 8B illustrates a process in which a time required for performing a positioning operation is reduced compared to the process in FIG. 8A.

In operation 821, the first electronic device 200 may receive a first signal (e.g., a poll signal) from the second electronic device 801 by using the first antenna 401 and the second antenna 402. The first electronic device 200 may not identify a transmission time of the first signal in a state of not being synchronized with the second electronic device 801. In operation 822, the first electronic device 200 may transmit a second signal (e.g., a response signal) to the second electronic device 801 by using the first antenna 401 after a configured time (e.g., Tdelay) after receiving the first signal. In operation 823, the first electronic device 200 may transmit a second signal (e.g., a response signal) to the second electronic device 801 by using the second antenna 402 after a configured time (e.g., Tdelay) after receiving the first signal. In operation 824, the first electronic device 200 may receive a third signal (e.g., final data) from the second electronic device 801 by using the first antenna 401 and the second antenna 402.

According to an embodiment, the first electronic device 200 may individually receive a third signal (e.g., final data) transmitted from the second electronic device 801 by using the first antenna 401 and the second antenna 402 so as to reduce a time required for performing positioning.

Figure 9A:
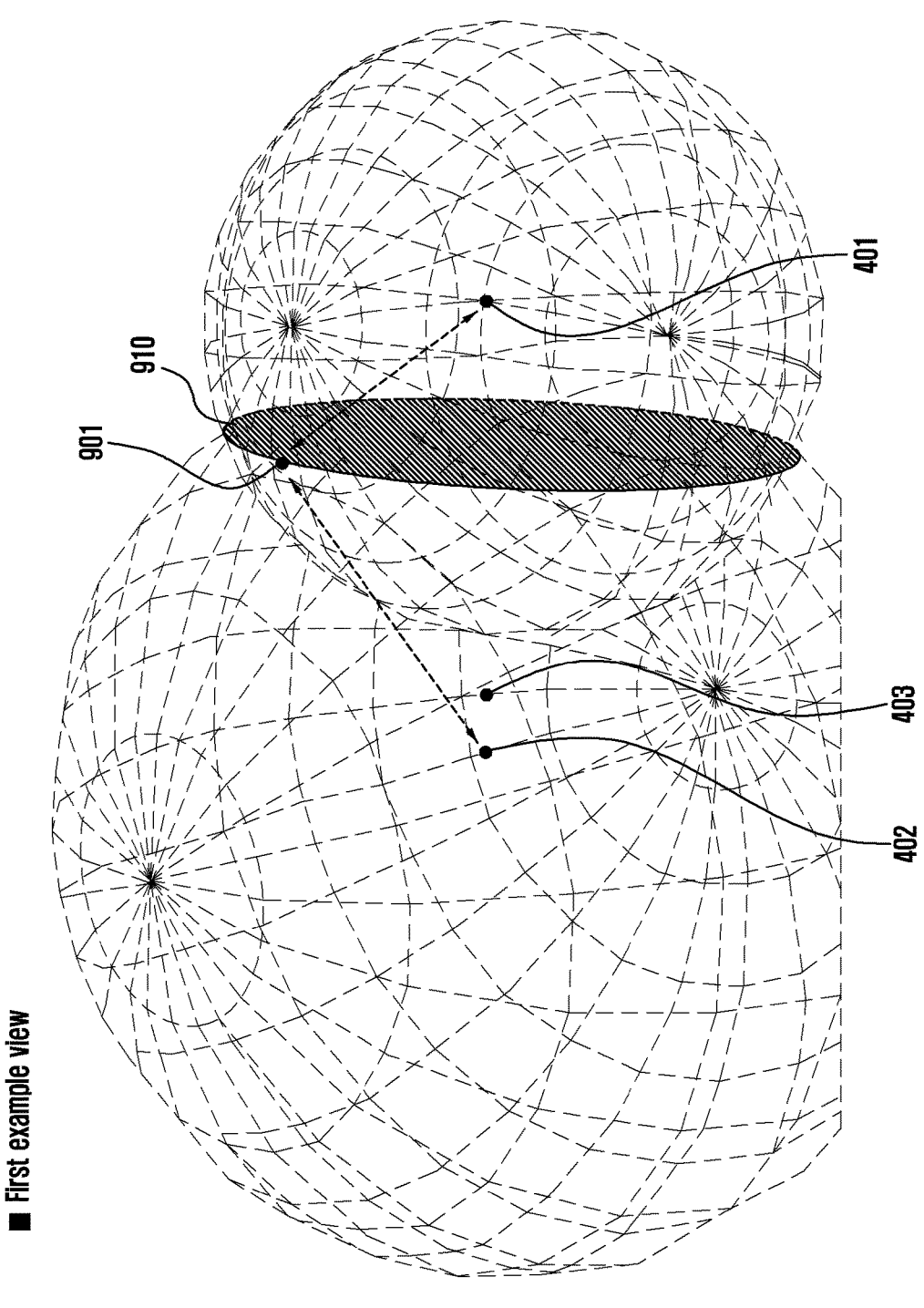
FIG. 9A is a first example view illustrating a positioning trajectory determined by using a first antenna and a second antenna according to an embodiment of the disclosure.

FIG. 9A is a first example view illustrating a positioning trajectory determined by using a first antenna and a second antenna according to an embodiment of the disclosure.

Referring to FIG. 9A, the electronic device 101 (e.g., a first electronic device) including multiple antennas (e.g., the first antenna 401, the second antenna 402, and/or the third antenna 403) may measure a reception time corresponding to each antenna to measure a position of an external electronic device (e.g., a second electronic device). For example, the first electronic device 101 may transmit a first signal to the second electronic device and receive a second signal corresponding to a response signal to the first signal. The first electronic device 101 may measure each of a first reception time of the second signal received through the first antenna 401 and a second reception time of the second signal received through the second antenna 402. According to an embodiment, the first electronic device 101 may identify a reception time difference based on the first reception time and the second reception time and predict a position of the second electronic device corresponding to the reception time difference.

Referring to FIG. 9A, the first electronic device 101 may predict a position of the second electronic device based on a reception time difference and represent the predicted position as a single trajectory 910. According to an embodiment, the second electronic device 901 may be positioned at a point included in the trajectory 910.

Figure 9B:
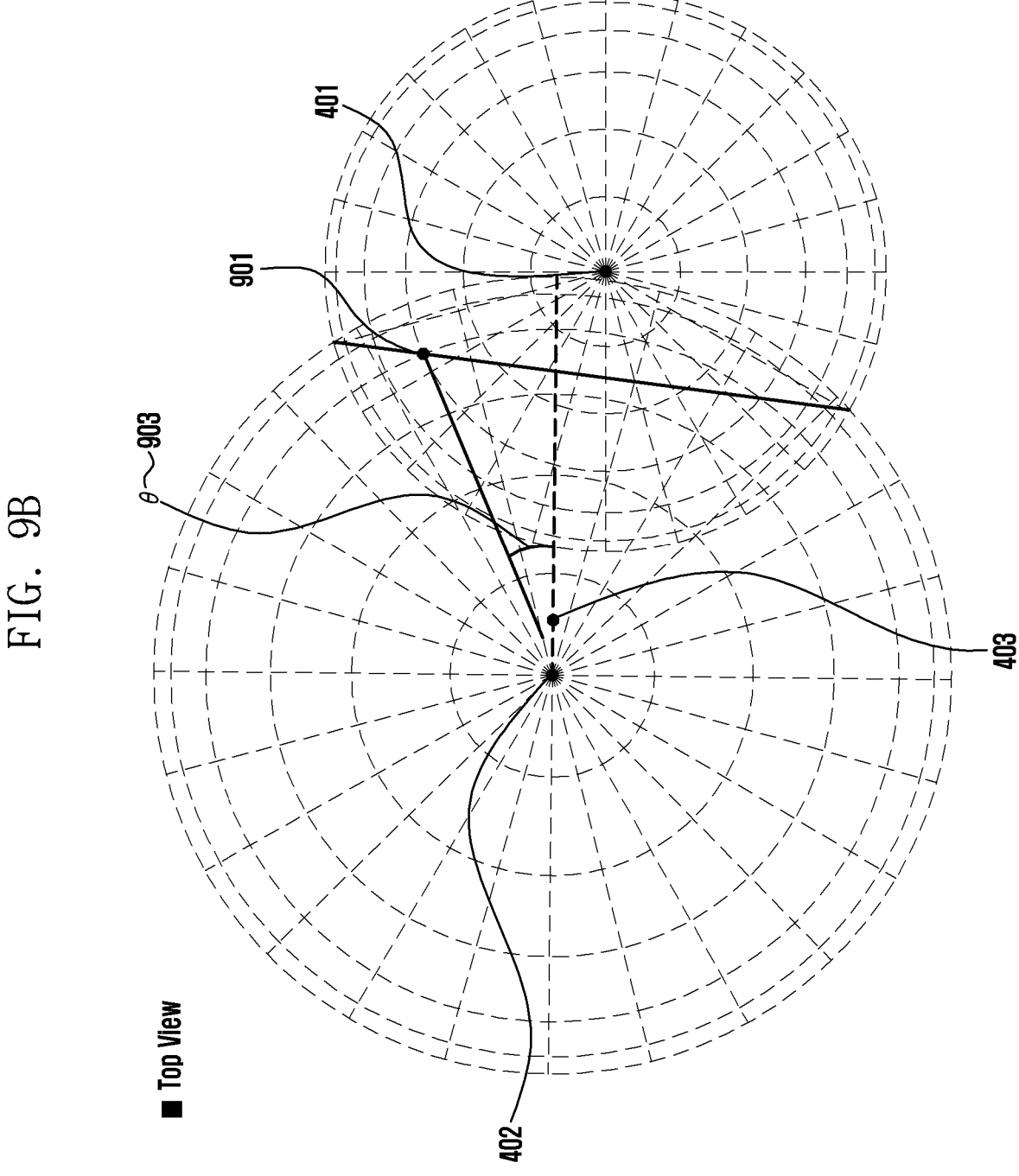
FIG. 9B is a second example view illustrating a process of measuring an angle of an external electronic device based on a positioning trajectory according to an embodiment of the disclosure.

FIG. 9B is a second example view illustrating a process of measuring an angle of an external electronic device based on a positioning trajectory according to an embodiment of the disclosure.

Referring to FIG. 9B, the electronic device 101 (e.g., a first electronic device) may predict a position of an external electronic device (e.g., the second electronic device 901) by using the first antenna 401 and the second antenna 402.

Referring to FIG. 9B, the first electronic device 101 may identify an angle (0) 903 with respect to a position of the second electronic device 901 with reference to a horizontal line for the second antenna 402 and the third antenna 403. According to an embodiment, the first electronic device 101 may measure a reception time for the second electronic device 901 from each antenna and predict a position of the second electronic device 901 based on the reception time difference. The first electronic device 101 may measure an angle of arrival (AoA) through a positioning operation.

Figure 10A:
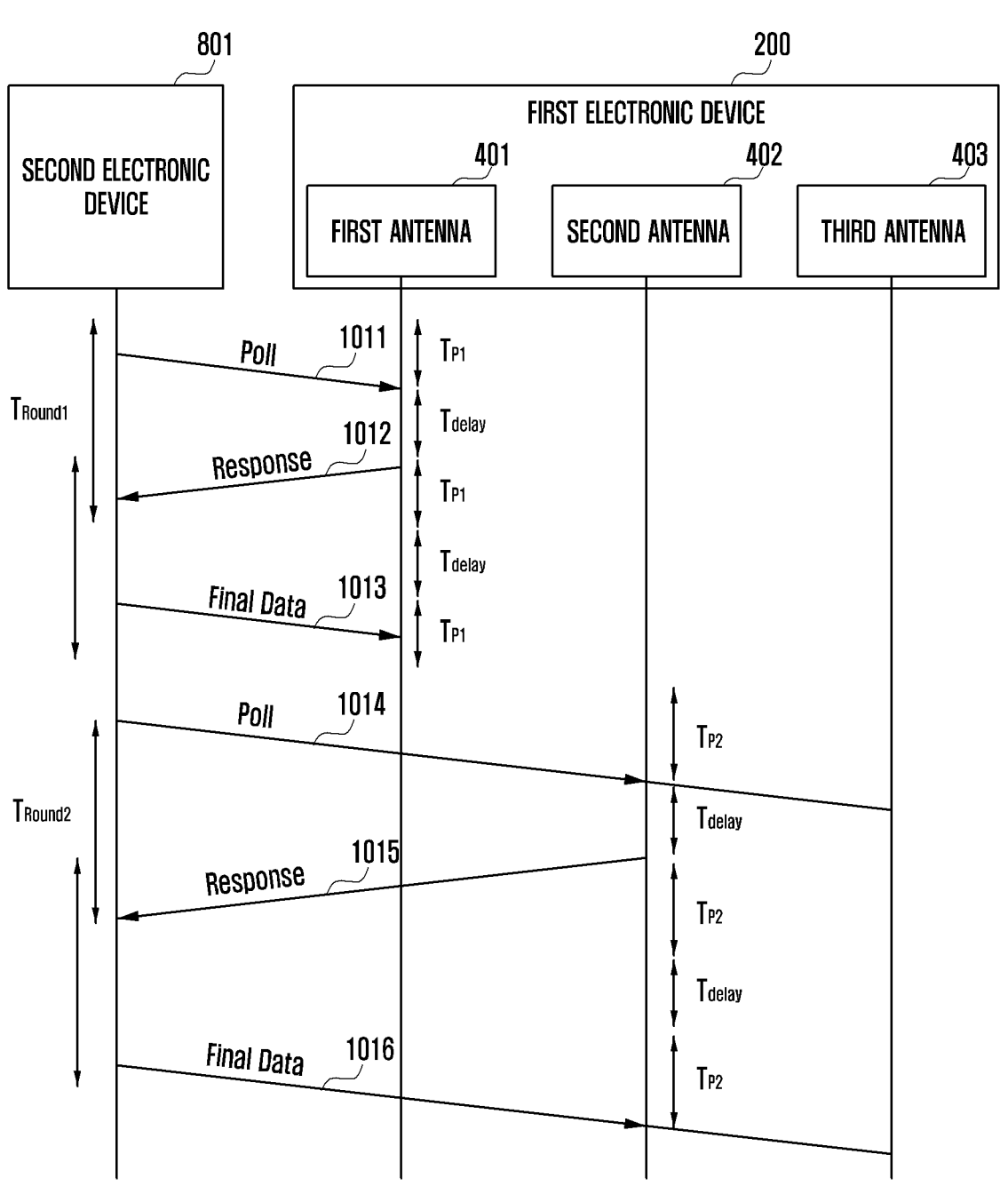
FIG. 10A is a first example view illustrating a process of performing positioning by using a first antenna, a second antenna, and a third antenna according to an embodiment of the disclosure.

FIG. 10A is a first example view illustrating a process of performing positioning by using a first antenna, a second antenna, and a third antenna according to an embodiment of the disclosure.

According to an embodiment, an electronic device (e.g., the electronic device 200 in FIG. 2A and a first electronic device) may perform wireless communication (e.g., UWB communication) with an external electronic device 801 (e.g., a second electronic device). The first electronic device 200 may include multiple antennas (e.g., the first antenna 401, the second antenna 402, and/or the third antenna 403) supporting UWB communication. The first antenna 401 and the second antenna 402 may be designed to transmit and receive a signal and the third antenna 403 may be designed to receive a signal.

In operation 1011, the first electronic device 200 may receive a first signal (e.g., a poll signal) from the second electronic device 801 by using the first antenna 401. The first electronic device 200 may not identify a reception time of the first signal in a state of not being synchronized with the second electronic device 801. In operation 1012, the first electronic device 200 may transmit a second signal (e.g., a response signal) to the second electronic device 801 by using the first antenna 401 after a configured time (e.g., Tdelay) after receiving the first signal. In operation 1013, the first electronic device 200 may receive a third signal (e.g., final data) from the second electronic device 801 by using the first antenna 401. According to an embodiment, the first electronic device 200 may measure a first reception time (e.g., Tround1) with respect to the second electronic device 801 based on the first antenna 401.

In operation 1014, the first electronic device 200 may receive a first signal (e.g., a poll signal) from the second electronic device 801 by using the second antenna 402 and the third antenna 403. The first electronic device 200 may not identify a reception time of the first signal in a state of not being synchronized with the second electronic device 801. In operation 1015, the first electronic device 200 may transmit a second signal (e.g., a response signal) to the second electronic device 801 by using the second antenna 402 after a configured time (e.g., Tdelay) after receiving the first signal. In operation 1016, the first electronic device 200 may receive a third signal (e.g., final data) from the second electronic device 801 by using the second antenna 402 and the third antenna 403. According to an embodiment, the first electronic device 200 may measure a second reception time (e.g., Tround2) with respect to the second electronic device 801 based on the second antenna 402.

According to an embodiment, the first electronic device 200 may measure a first reception time based on the first antenna 401 and a second reception time based on the second antenna 402, and perform a positioning operation based on a time difference between the first reception time and the second reception time.

Figure 10B:
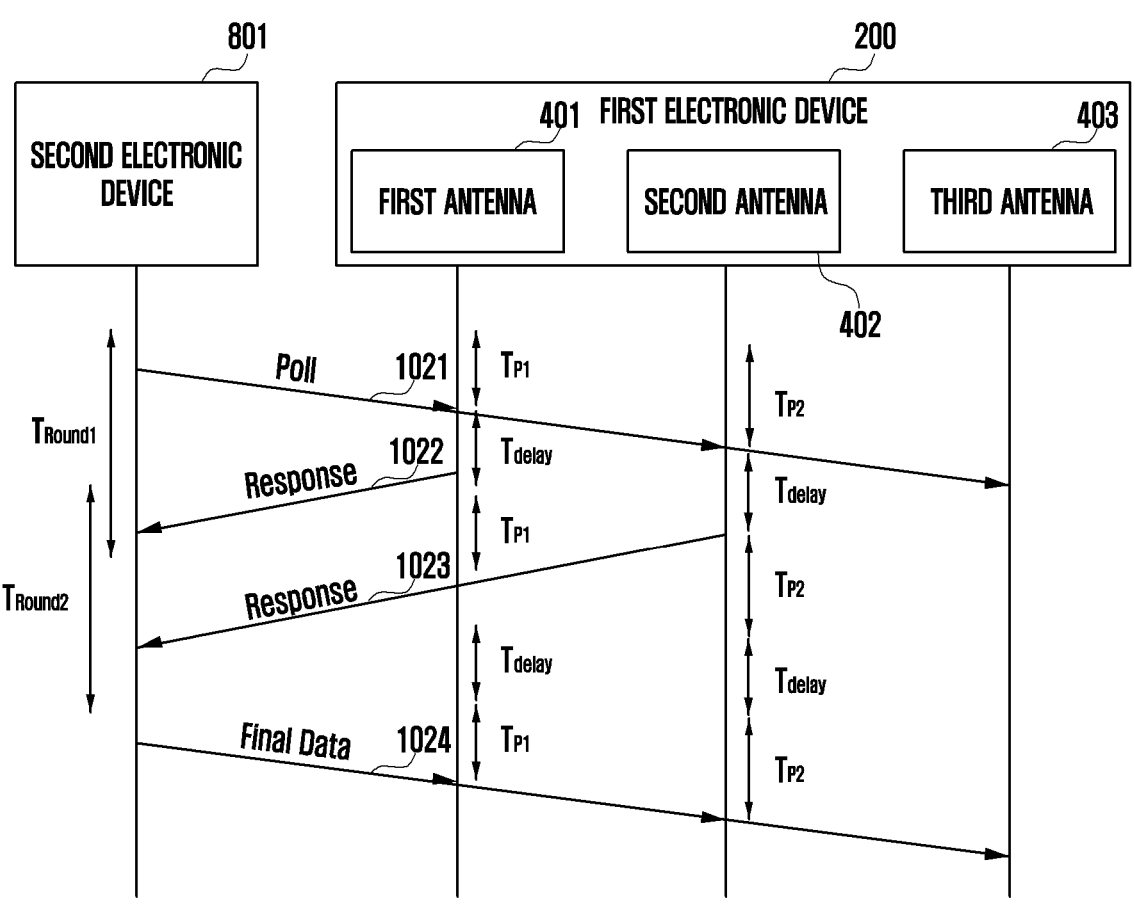
FIG. 10B is a second example view illustrating a process of performing positioning by using a first antenna, a second antenna, and a third antenna according to an embodiment of the disclosure.

FIG. 10B is a second example view illustrating a process of performing positioning by using a first antenna, a second antenna, and a third antenna according to an embodiment of the disclosure. FIG. 10B illustrates a process in which a time required for performing a positioning operation is reduced compared to the process in FIG. 10A.

In operation 1021, the first electronic device 200 may receive a first signal (e.g., a poll signal) from the second electronic device 801 by using the first antenna 401, the second antenna 402, and/or the third antenna 403. The first electronic device 200 may not identify a transmission time of the first signal in a state of not being synchronized with the second electronic device 801. In operation 1022, the first electronic device 200 may transmit a second signal (e.g., a response signal) to the second electronic device 801 by using the first antenna 401 after a configured time (e.g., Tdelay) after receiving the first signal. In operation 1023, the first electronic device 200 may transmit a second signal (e.g., a response signal) to the second electronic device 801 by using the second antenna 402 after a configured time (e.g., Tdelay) after receiving the first signal. In operation 1024, the first electronic device 200 may receive a third signal (e.g., final data) from the second electronic device 801 by using the first antenna 401, the second antenna 402, and/or the third antenna 403.

According to an embodiment, the first electronic device 200 may individually receive a third signal (e.g., final data) transmitted from the second electronic device 801 by using the first antenna 401 and the second antenna 402 so as to reduce a time required for performing positioning.

Figure 11:
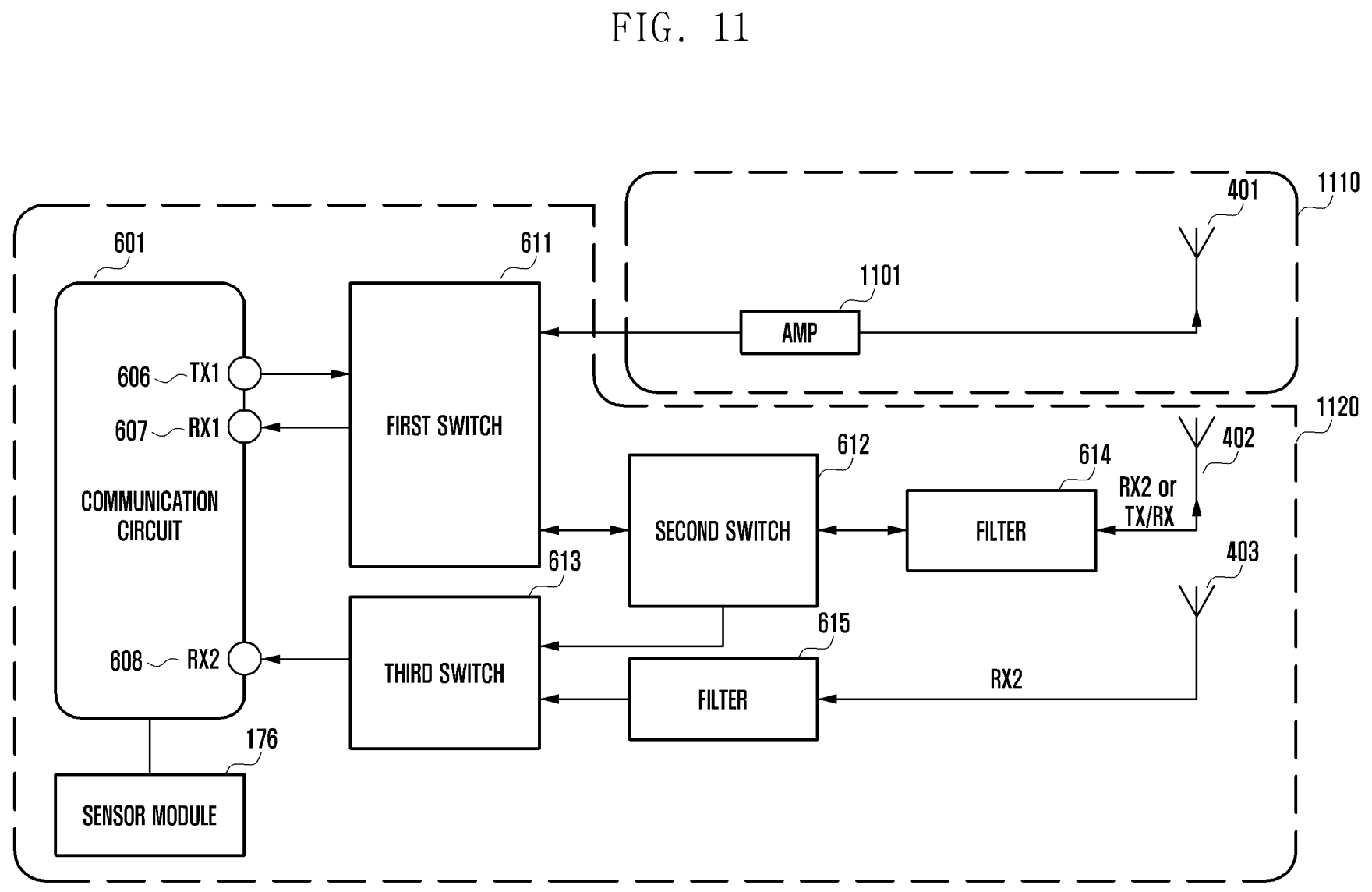

FIG. 11 is a block diagram of an electronic device including an amplification circuit additionally designed in a first housing according to an embodiment of the disclosure.

According to various embodiments, an electronic device (e.g., the electronic device 200 in FIG. 2A) including multiple housings (e.g., the first housing 210 and the second housing 220 in FIG. 2A) may be implemented to include distributively arranged multiple antennas (e.g., the first antenna 401, the second antenna 402, and/or the third antenna 403 in FIG. 4A). For example, the first antenna 401 may be disposed in the first housing 210 and the second antenna 402 and the third antenna 403 may be disposed in the second housing 220. The electronic device 200 may include a foldable electronic device operating in the folded state or the unfolded state based on the first housing 210 and the second housing 220. According to an embodiment, in case that the electronic device 200 is in the unfolded state, the first antenna 401 may be spaced a predetermined distance (e.g., about 10 cm) apart from the second antenna 402. According to an embodiment, the first antenna 401 and the second antenna 402 may support the UWB communication and a UWB communication band (e.g., 6.2 Ghz to 8.2 Ghz) corresponds to a high frequency band, thus causing deterioration in a quality of a signal according to a distance greater than a predetermined distance.

Referring to FIG. 11, the electronic device 200 may include a first housing 1110 (e.g., the first housing 210 in FIG. 2A) and a second housing 1120 (e.g., the second housing 220 in FIG. 2A), and the first housing 1110 may include an amplifier 1101 (e.g., an amplifying circuit and an amplifier (AMP)) configured to amplify a signal through the first antenna 401. According to an embodiment, the electronic device 200 may amplify a signal received through the first antenna 401 by using the amplifier 1101 and improve quality deterioration of a signal due to a spacing distance between the first antenna 401 and the second antenna 402. According to an embodiment, antennas arranged in the first housing 1110 and the second housing 1120 are not limited to FIG. 11 and the number of amplifiers 1101 is not limited thereto.

Figure 12A:
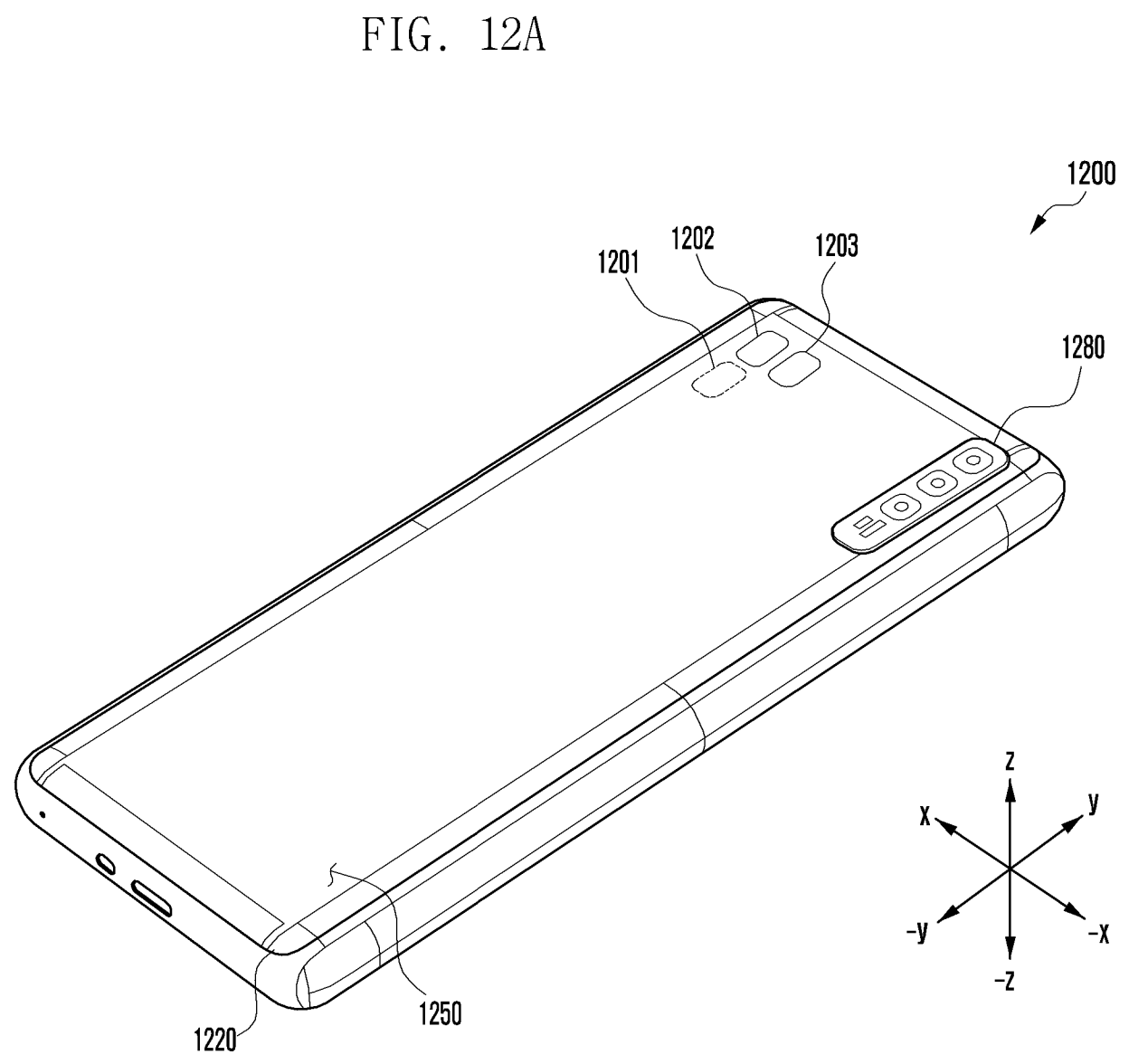
Figure 12B:
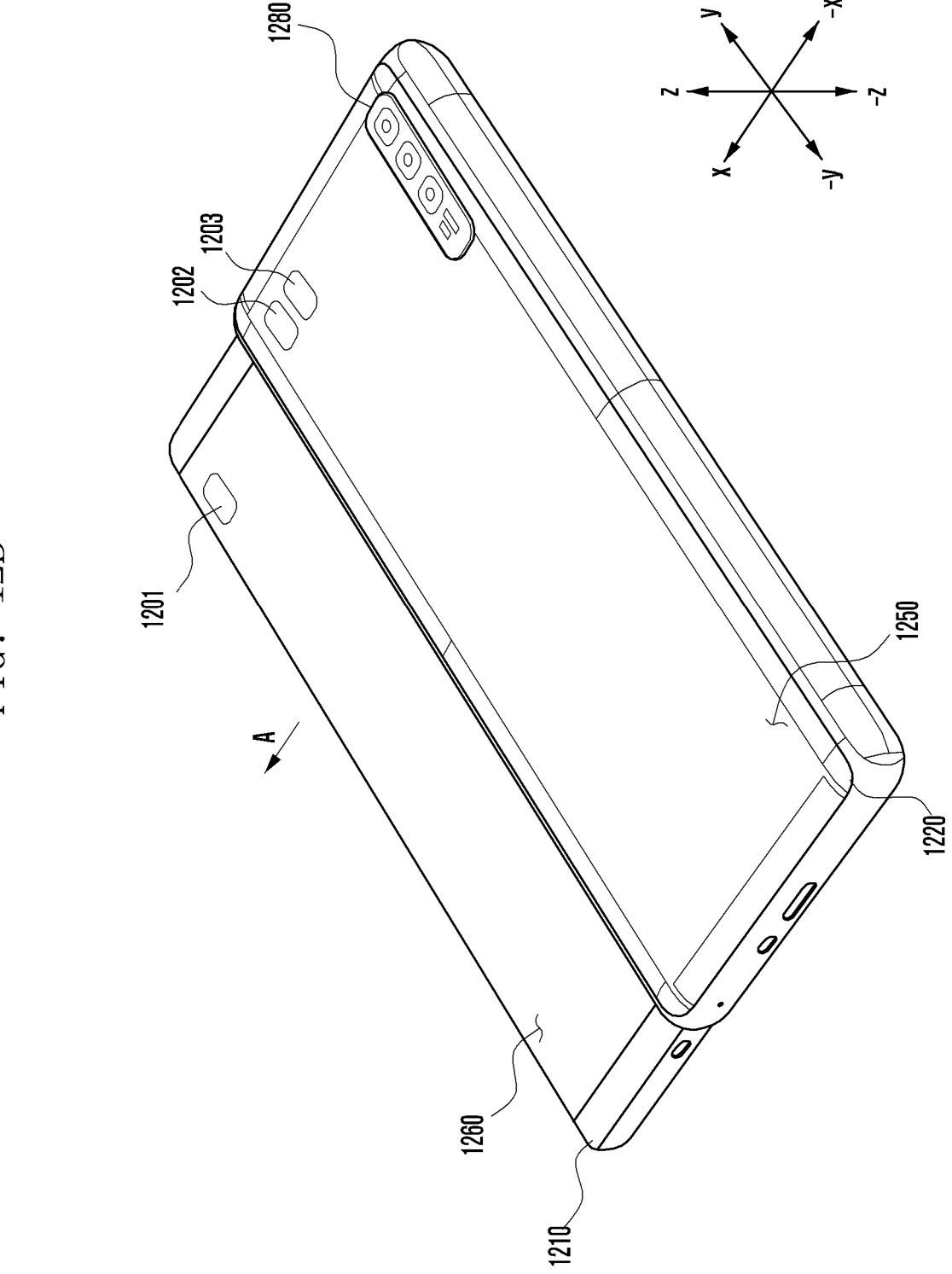
FIG. 12B is an example view illustrating arrangement of a first antenna, a second antenna, and a third antenna in a rollable electronic device in a second mode according to an embodiment of the disclosure.

FIG. 12A is an example view illustrating arrangement of a first antenna, a second antenna, and a third antenna in a rollable electronic device in a first mode according to an embodiment of the disclosure. FIG. 12B is an example view illustrating arrangement of a first antenna, a second antenna, and a third antenna in a rollable electronic device in a second mode according to an embodiment of the disclosure.

According to various embodiments, the electronic device 1200 (e.g., the electronic device 101 in FIG. 1) may include multiple housings (e.g., a first housing 1210 and a second housing 1220) and the first housing 1210 may be implemented to be at least partially coupled to the second housing 1220. The electronic device 101 may include a rollable electronic device. The electronic device 101 may include a flexible display and the flexible display may be at least partially inserted into the second housing 1220 in response to a first mode (e.g., an insertion state) and exposed to the outside in an unfolded form in response to a second mode (e.g., a withdrawal state). For example, the first mode may be defined as a mode in which the first housing 1210 slides to be inserted into the second housing 1220. The second mode may be defined as a mode in which the first housing 1210 slides to the outside from the second housing 1220 so that the flexible display is maximally extended.

FIG. 12A illustrates a second rear cover 1250 of the second housing 1220 of the electronic device 101 in the first mode. The second housing 1220 may include a camera module 1280 (e.g., the camera module 180 in FIG. 1) and include a second antenna 1202 and a third antenna 1203 arranged adjacent to the second rear cover 1250.

FIG. 12B illustrates a first rear cover 1260 of the first housing 1210 and the second rear cover 1250 of the second housing 1220 of the electronic device 101 in the second mode. According to an embodiment, the electronic device 101 may be converted from the first mode to the second mode when the first housing 1210 at least partially moves in direction A. According to an embodiment, the first antenna 1201 may be disposed in the first housing 1210, and the second antenna 1202 and the third antenna 1203 may be disposed in the second housing.

According to an embodiment, in the first mode, the first antenna 1201, the second antenna 1202, and the third antenna 1203 may be arranged spaced λ/2 (e.g., about 1.81 cm to 2.40 cm based on the UWB communication method (e.g., a frequency band of about 6.25 GHz to 8.25 GHZ) apart from each other. The electronic device 101 may measure a phase difference with an external electronic device by using the first antenna 1201 and the second antenna 1202 in the first mode and perform a positioning operation with respect to the external electronic device based on the phase difference.

According to an embodiment, the first antenna 1201 and the second antenna 1202 may be arranged spaced a predetermined distance apart from each other in the second mode. For example, the predetermined distance may be measured by using [1/BW (band width)*PLL value]. For example, in case that a frequency band of about 500 MHz and a phase locked loop (PPL) with an error of about 10% are used, the predetermined distance may be about 6 cm. The first antenna 1201 and the second antenna 1202 may be arranged spaced about 6 cm apart from each other in the second mode. The electronic device 101 may measure a reception time difference with an external electronic device by using the first antenna 1201 and the second antenna 1202 in the second mode and perform a positioning operation with respect to the external electronic device based on the reception time difference.

According to an embodiment, the electronic device 1200 may perform a positioning operation with respect to an external electronic device (e.g., the external electronic device) based on a phase difference in the first mode and/or may perform positioning with respect to an external electronic device by applying a weighting to a positioning operation with respect to the external electronic device based on a reception time difference. For example, in an intermediate state between the first mode and the second mode, the electronic device 1200 may measure a distance between the first antenna 1201 and the second antenna 1202 and apply a weighting based on the measured distance. For example, the distance between the first antenna 1201 and the second antenna 1202 may be configured with a specific threshold value. In case that a distance between the first antenna 1201 and the second antenna 1202 is less than or equal to the configured threshold value, a weighting may be applied to a positioning operation corresponding to the first mode, and in case that the distance is greater than or equal to the configured threshold value, a weighting may be applied to a positioning operation corresponding to the second mode. By way of example, the weighting may indicate a reference rate of an operation for performing positioning based on a phase difference and an operation for performing positioning based on a reception time difference when estimating positioning of an external electronic device, an operation to which a weighting is applied may have a higher reference rate compared to an operation to which a weighting is not applied.

According to various embodiments, in case that a foldable electronic device (e.g., an electronic device (e.g., the electronic device 200 in FIG. 2A)) in the folded state, the electronic device 200 may perform a positioning operation based on a phase difference by using a first antenna (e.g., the first antenna 401 in FIG. 4A) and a second antenna (e.g., the second antenna 402 in FIG. 4A). In case that the foldable electronic device is in the unfolded state, the electronic device 200 may perform a positioning operation based on a reception time difference by using the first antenna 401 and the second antenna 402. According to an embodiment, in an intermediate state between the folded state and the unfolded state, the electronic device 200 may measure a distance between the first antenna 401 and the second antenna 402 and apply a weighting based on the measured distance. According to an embodiment, the weighting may indicate a reference rate of an operation for performing positioning based on a phase difference and an operation for performing positioning based on a reception time difference when estimating positioning of an external electronic device, an operation to which a weighting is applied may have a higher reference rate compared to an operation to which a weighting is not applied.

A method according to various embodiments may include, an operation of identifying, by using a sensor module (e.g., the sensor module 176 in FIG. 6) in an electronic device (e.g., the electronic device 200 in FIG. 2A) including a first housing (e.g., the first housing 210 in FIG. 2A) and a second housing (e.g., the second housing 220 in FIG. 2A), a folding mode in which the first housing 210 and the second housing 220 are folded, an operation of transmitting a first signal to an external electronic device by using a first antenna (e.g., the first antenna 401 in FIG. 6) included in the first housing 210, an operation of receiving a first response signal to the first signal based on the first antenna 401 and measuring a first phase value corresponding to the received first response signal, an operation of receiving a second response signal to the first signal based on a second antenna (e.g., the second antenna 402 in FIG. 6) included in the second housing 220 and measuring a second phase value corresponding to the received second response signal, and an operation of performing positioning with respect to the external electronic device based on the first phase value and the second phase value.

According to an embodiment, the operation of performing positioning may include an operation of identifying a phase difference based on the first phase value and the second phase value and an operation of identifying a spacing distance from and an angle with respect to the external electronic device based on the identified phase difference.

The method according to an embodiment may further include an operation of identifying, by using the sensor module 176, an unfolding mode in which the first housing 210 and the second housing 220 are unfolded, an operation of transmitting a first signal to the external electronic device by using the first antenna 401, an operation of receiving a first response signal to the first signal based on the first antenna 401 and measuring a first reception time of the first response signal, an operation of receiving a second response signal to the first signal based on the second antenna 402 and measuring a second reception time of the second response signal, and an operation of performing positioning with respect to the external electronic device based on the first reception time and the second reception time.

According to an embodiment, the operation of performing positioning may include an operation of identifying a reception time difference based on the first reception time and the second reception time and an operation of identifying a spacing distance from and an angle with respect to the external electronic device based on the identified reception time difference, wherein the first antenna 401 and the second antenna 402 may be arranged spaced a configured distance apart from each other in the unfolding mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless electronic device comprising:
a foldable housing comprising:
a first housing;
a second housing:
a hinge configured to connect the first housing and the second housing;
a first antenna disposed at the first housing and configured to support a first frequency band; and
a second antenna disposed at the second housing and configured to support the first frequency band,
wherein the first housing and the second housing are foldably connected to each other,
wherein, when the wireless electronic device is in a folded state in which the first housing and the second housing are folded around the hinge, the first antenna and the second antenna are arranged to be spaced apart from each other by half a wavelength corresponding to the first frequency band, and
wherein, when the wireless electronic device is in an unfolded state in which the first housing and the second housing are unfolded around the hinge, the first antenna and the second antenna are arranged to be spaced a configured distance or more apart from each other, the configured distance being determined based on the first frequency band and a phase locked loop (PLL).

2. The wireless electronic device of claim 1, wherein the first antenna and the second antenna support a high frequency band corresponding to a frequency band used for ultra-wideband (UWB) communication.

3. The wireless electronic device of claim 1,
wherein the foldable housing further comprises:
a third antenna disposed at the second housing and being configured to support the first frequency band, and
wherein the second antenna and the third antenna are arranged based on a first axis.

4. The wireless electronic device of claim 3, wherein, when the wireless electronic device is in the folded state, the first antenna and the second antenna are arranged based on a second axis formed perpendicular to the first axis.

5. The wireless electronic device of claim 1, wherein the configured distance is reduced as the first frequency band and an accuracy of the PLL being used increases.

6. A wireless electronic device comprising:
sensor circuitry configured to detect a folding mode in which a first housing and a second housing of the wireless electronic device are in one of a folded mode or an unfolded mode, the folded mode being a mode in which the first housing and the second housing are folded around a hinge, the unfolded mode being a mode in which the first housing and the second housing are unfolded around the hinge:

a first antenna disposed at the first housing and configured to transmit and receive a signal based on a first frequency band:

a second antenna disposed at the second housing and configured to transmit and receive a signal based on the first frequency band:

memory, comprising one or more storage media, storing instructions; and one or more processors communicatively coupled to the sensor circuitry, the first antenna, the second antenna, and the memory, wherein the instructions, when executed by the one or more processors individually or collectively, cause the wireless electronic device to:

identify the folding mode from among the folded mode and the unfolded mode by using the sensor circuitry, transmit a first signal to an external wireless electronic device through the first antenna, receive, using the first antenna, a first response signal responding to the first signal and measure a first phase value corresponding to the first response signal, receive, using the second antenna, a second response signal responding to the first signal and measure a second phase value corresponding to the second response signal, and perform a positioning operation with respect to the external wireless electronic device based on the first phase value and the second phase value, and wherein, when the wireless electronic device is in the folded mode, the first antenna and the second antenna are arranged to be spaced apart from each other by half a wavelength corresponding to the first frequency band, and wherein, when the wireless electronic device is in the unfolded mode, the first antenna and the second antenna are arranged to be spaced a configured distance or more apart from each other, the configured distance being determined based on the first frequency band and a phase locked loop (PLL).

7. The wireless electronic device of claim 6, wherein the instructions, when executed by the one or more processors individually or collectively, further cause the wireless electronic device to:

identify a phase difference based on the first phase value and the second phase value; and identify a spacing distance from the external wireless electronic device and identify an angle with respect to the external wireless electronic device based on the phase difference.

8. The wireless electronic device of claim 6, further comprising:

a first switch connected to the first antenna; and a second switch connected to the first antenna and the second antenna, wherein the instructions, when executed by the one or more processors individually or collectively, further cause the wireless electronic device to:

identify the folding mode from among the folded mode and the unfolded mode by using the sensor circuitry, control the first switch to transmit a first signal to the external wireless electronic device through the first antenna, control the first switch and the second switch to receive a first response signal responding to the first signal based on the first antenna and measure a first reception time of the first response signal, control the first switch and the second switch to receive a second response signal responding to the first signal based on the second antenna and measure a second reception time of the second response signal, and perform the positioning operation with respect to the external wireless electronic device based on the first reception time and the second reception time.

9. The wireless electronic device of claim 8, wherein the instructions, when executed by the one or more processors individually or collectively, further cause the wireless electronic device to:

identify a reception time difference based on the first reception time and the second reception time, and identify a spacing distance from the external wireless electronic device and identify an angle with respect to the external wireless electronic device based on the reception time difference.

10. The wireless electronic device of claim 8, wherein the instructions, when executed by the one or more processors individually or collectively, further cause the wireless electronic device to:

identify a trajectory indicating a predicted position of the external wireless electronic device based on the reception time difference, determine a position of the external wireless electronic device based on the trajectory, and identify an angle of the external wireless electronic device corresponding to the position.

11. The wireless electronic device of claim 8, further comprising:

an amplifying circuit disposed between the first antenna and the first switch, wherein the instructions, when executed by the one or more processors individually or collectively, further cause the wireless electronic device to:

in case of transmitting or receiving a signal through the first antenna, amplify the signal by using the amplifying circuit.

12. The wireless electronic device of claim 6, further comprising:

a third antenna capable of receiving a signal based on the first frequency band in the second housing, wherein the instructions, when executed by the one or more processors individually or collectively, further cause the wireless electronic device to:

receive a first response signal by using the second antenna, and receive a second response signal by using the third antenna.

13. A method performed by a wireless electronic device including a first housing a second housing, the method comprising:

identifying, by the wireless electronic device using sensor circuitry of the wireless electronic device, a folding mode in which the first housing and the second housing are in one of a folded mode or an unfolded mode, the folded mode being a mode in which the first housing and the second housing are folded around a hinge, the unfolded mode being a mode in which the first housing and the second housing are unfolded around the hinge:

transmitting, by the wireless electronic device, a first signal to an external wireless electronic device by using a first antenna disposed at the first housing;

receiving, by the wireless electronic device, a first response signal responding to the first signal based on the first antenna and measuring, by the wireless electronic device, a first phase value corresponding to the first response signal;

receiving, by the wireless electronic device, a second response signal responding to the first signal based on a second antenna disposed at the second housing and measuring, by the wireless electronic device, a second phase value corresponding to the second response signal; and performing, by the wireless electronic device, positioning with respect to the external wireless electronic device based on the first phase value and the second phase value, wherein the first antenna and the second antenna are configured to transmit and receive a signal based on a first frequency band, wherein, when the wireless electronic device is in the folded mode, the first antenna and the second antenna are spaced apart from each other by half a wavelength corresponding to the first frequency band, and wherein, when the wireless electronic device is in the unfolded mode, the first antenna and the second antenna are spaced a configured distance or more apart from each other, the configured distance being determined based on the first frequency band and a phase locked loop (PLL).

14. The method of claim 13, wherein the performing of the positioning comprises:

identifying, by the wireless electronic device, a phase difference based on the first phase value and the second phase value; and identifying, by the wireless electronic device, a spacing distance from the external wireless electronic device and identifying, by the wireless electronic device, an angle with respect to the external wireless electronic device based on the phase difference.

15. The method of claim 13, further comprising:

identifying, by the wireless electronic device using the sensor circuitry, that the wireless electronic device is in the unfolded mode;

transmitting, by the wireless electronic device using the first antenna, a first signal to the external wireless electronic device;

receiving, by the wireless electronic device, a first response signal responding to the first signal based on the first antenna and measuring, by the wireless electronic device, a first reception time of the first response signal;

receiving, by the wireless electronic device, a second response signal responding to the first signal based on the second antenna and measuring, by the wireless electronic device, a second reception time of the second response signal; and performing, by the wireless electronic device, the positioning with respect to the external wireless electronic device based on the first reception time and the second reception time.

16. The method of claim 15, wherein the performing of the positioning comprises:

identifying, by the wireless electronic device, a reception time difference based on the first reception time and the second reception time; and identifying, by the wireless electronic device, a spacing distance from the external wireless electronic device and identifying, by the wireless electronic device, an angle with respect to the external wireless electronic device based on the reception time difference.

17. The method of claim 13, wherein the first antenna and the second antenna support a high frequency band corresponding to a frequency band used for ultra-wideband (UWB) communication.

18. The wireless electronic device of claim 1, wherein, as the first frequency band increases and PPL is used, a minimum spacing distance between the first antenna and the second antenna decreases.

* * * * *